US011858249B2

(12) United States Patent
Tsai et al.

(10) Patent No.: US 11,858,249 B2
(45) Date of Patent: *Jan. 2, 2024

(54) STACKING SEQUENCE COMBINATIONS FOR DOUBLE-DOUBLE LAMINATE STRUCTURES

(71) Applicant: The Board of Trustees of the Leland Stanford Junior University, Stanford, CA (US)

(72) Inventors: Stephen W. Tsai, Honolulu, HI (US); Antonio Miravete, Lemoore, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/694,054

(22) Filed: Mar. 14, 2022

(65) Prior Publication Data
US 2022/0297407 A1 Sep. 22, 2022

Related U.S. Application Data

(60) Provisional application No. 63/161,668, filed on Mar. 16, 2021.

(51) Int. Cl.
*B32B 7/03* (2019.01)

(52) U.S. Cl.
CPC ............ *B32B 7/03* (2019.01); *B32B 2250/05* (2013.01)

(58) Field of Classification Search
CPC ............ B32B 2250/05; B32B 2250/20; B32B 2262/106; B32B 2307/558;
(Continued)

(56) References Cited

U.S. PATENT DOCUMENTS

| 4,063,981 A | 12/1977 | Rhodes et al. |
| 5,429,845 A | 7/1995 | Newhouse et al. |

(Continued)

FOREIGN PATENT DOCUMENTS

| EP | 2772351 A1 | 9/2014 |
| EP | 2830042 A1 | 1/2015 |

(Continued)

OTHER PUBLICATIONS

Akbulut, et al., "Optimum design of composit laminates for minimum thickness," computer and Structures, 86, 1974-1982, (2008).

(Continued)

*Primary Examiner* — Lawrence D Ferguson
(74) *Attorney, Agent, or Firm* — Alston & Bird LLP

(57) ABSTRACT

A sub-laminate module is described for use in forming composite laminate structures. The module includes a first ply set containing a first ply layer oriented at a first angle and a second ply layer oriented at a second angle, the second angle being unequal the first angle; a second ply set containing a third ply layer oriented at a third angle and a fourth ply layer oriented at a fourth angle, the fourth angle being unequal the third angle; first and second equal acute angles are defined by differences between an absolute value of the first and second angles and the third and fourth angles, respectively, wherein the second ply layer is positioned adjacent the third ply layer and the second and third ply layers are both positioned intermediate the first and fourth ply layers, so as to define a staggered double-double helix sequence of the respective ply layers. Associated composite laminate structures and methods are also disclosed.

20 Claims, 28 Drawing Sheets

(58) Field of Classification Search
CPC ........ B32B 2307/718; B32B 2307/748; B32B 2439/40; B32B 2603/00; B32B 2605/18; B32B 5/12; B32B 5/26; B32B 7/03
See application file for complete search history.

(56) References Cited

U.S. PATENT DOCUMENTS

| | | | |
|---|---|---|---|
| 5,476,189 | A | 12/1995 | Duvall et al. |
| 9,296,174 | B2 | 3/2016 | Tsai et al. |
| 2006/0093802 | A1 | 5/2006 | Tsai et al. |
| 2012/0177872 | A1 | 7/2012 | Tsai et al. |
| 2014/0170371 | A1 | 6/2014 | Kamiya et al. |
| 2015/0030805 | A1 | 1/2015 | Tsai et al. |
| 2021/0114336 | A1 | 4/2021 | Tsai et al. |

FOREIGN PATENT DOCUMENTS

| | | |
|---|---|---|
| EP | 2663450 B1 | 7/2018 |
| WO | WO 2018/181983 A1 | 10/2018 |
| WO | WO 2018/187186 A1 | 10/2018 |
| WO | WO 2020/252126 A1 | 12/2020 |

OTHER PUBLICATIONS

An, et al., "Stacking sequence optimization and blending design of laminated composite structures," Structural and Mulitdisciplinary Optimization, published online Nov. 28, 2018, doi.org/10.1007/s00158-018-2158-1.

Chen et al., "Optimal design of composite laminates for minimizing delamination stresses by particle swarm optimization combined with FEM," Structural Engineering and Mechanics, vol. 31, No. 4, 407-421, (2009).

Hühne, C. et al. Robust Design Of Composite Cylindrical Shells Under Axial Compression—Simulation and Validation, Thin-Walled Structures, Issue 46, (2008), pp. 947-962.

Khot, N.S. On The Influence Of Initial Geometric Imperfections On The Buckling and Postbuckling Behavior Of Fiber-Reinforced Cylindrical Shells Under Uniform Axial Compression, Technical Report AFFDL-TR-68-136, Oct. 1968, (69 pages), Air Force Flight Dynamics Laboratory Wright-Patterson Air Force Base, Ohio.

Zhang, et al., "Winding orientation optimization design of composite tubes based on quasi-static and dynamic experiments," Thin-Walled Structures, 127, 425-433, (2018).

U.S. Appl. No. 16/500,337, Non-Final Office Action dated May 13, 2021.

U.S. Appl. No. 16/500,337, Requirement for Restriction/Election dated Jan. 26, 2021.

U.S. Appl. No. 16/500,337, Non-Final Office Action dated Nov. 12, 2021.

WIPO Application No. PCT/US2018/025600, PCT International Preliminary Report on Patentability dated Oct. 8, 2019.

WIPO Application No. PCT/US2018/025600, PCT International Search Report and Written Opinion of the International Searching Authority dated Jul. 17, 2018.

WIPO Application No. PCT/US2020/037171, PCT International Preliminary Report on Patentability dated Dec. 14, 2021.

WIPO Application No. PCT/US2020/037171, PCT International Search Report and Written Opinion of the International Searching Authority dated Sep. 18, 2020.

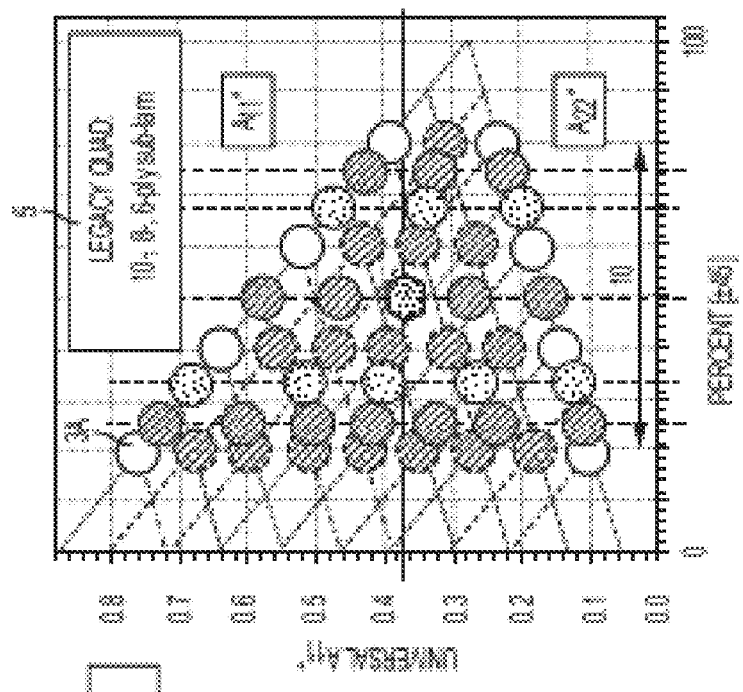
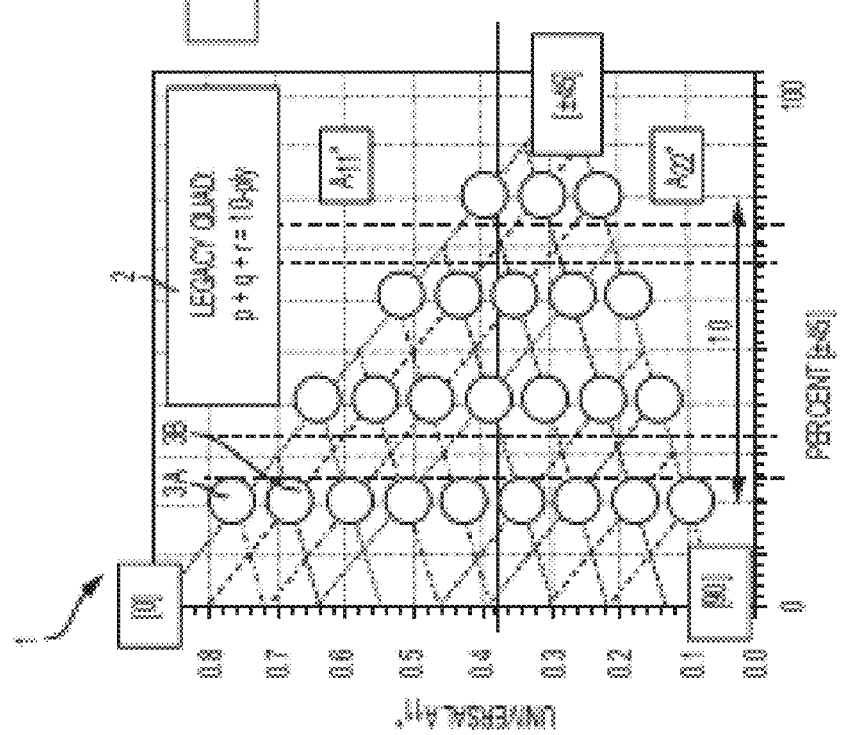
FIG. 1A
PRIOR ART
FIG. 1B
PRIOR ART

| A11° | 0 | 10 | 20 | 30 | 40 | 50 | 60 | 70 | 80 | 90 |
|---|---|---|---|---|---|---|---|---|---|---|
| 0 | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.138 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

Single – double: paired versus staggered 1

ABBD* for [±25]$_S$

| 21.21 | 4.47 | 0 | | | 0 | 0 | 0.73 | |
|---|---|---|---|---|---|---|---|---|
| 4.47 | 2.95 | 0 | | | 0 | 0 | 0.18 | |
| 0 | 0 | 4.96 | | | 0.73 | 0.18 | 0 | |

| 0 | 0 | 0 | | | 21.21 | 4.47 | 0 | |
| 0 | 0 | 0 | | | 4.47 | 2.95 | 0 | |
| 2.19 | 0.54 | 0 | | | 0 | 0 | 4.96 | |

ABBD* for [+25/−25/−25/25]$_3$

| 21.21 | 4.47 | 0 | | | 0 | 0 | 0 |
| 4.47 | 2.95 | 0 | | | 0 | 0 | 0 |
| 0 | 0 | 4.96 | | | 0 | 0 | 0 |

| 0 | 0 | 0 | | | 21.21 | 4.47 | 0.73 |
| 0 | 0 | 0 | | | 4.47 | 2.95 | 0.18 |
| 0 | 0 | 0 | | | 0.73 | 0.18 | 4.96 |

For 3 repeats we already have reached homogenization.

FIG. 11

STACKING SEQUENCE COMBINATIONS FOR DOUBLE-DOUBLE LAMINATE STRUCTURES

CROSS REFERENCE TO RELATED APPLICATIONS

This application claims priority to and the benefit of U.S. Provisional Application No. 63/161,668, filed Mar. 16, 2021; the contents of which as are hereby incorporated by reference in their entirety.

BACKGROUND

Technical Field

The present invention relates generally to certain applications of composite laminates and/or utilization of the composite laminates via two specific stacking sequences that maximize desirable material characteristics of the composite laminates across an entire field of double-double laminate angles.

Description of Related Art

Conventional composite laminate structures were generally designed to emulate the strength characteristics of conventional metal-based laminate materials and as such are constrained to designs having layers of plies that are both symmetrical and balanced. Such conventional structures, when so constrained and containing at least four distinct ply layers formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [±45] and [90] plies (see e.g., legacy quad field 1, illustrated in FIG. 1A and detailed elsewhere herein). When one each of the three layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered. In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry, and a limit of three on-ply orientation groupings (i.e., no more identical ply groupings can be stacked together).

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone, and multiple failure modes resulting from thousands of fiber discontinuities and matrix cracking. Complex procedures to blend adjacent laminates with different stacking and thickness, and to drop or add plies are required for a complex structure and impede optimization and manufacturing.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1B; see also FIG. 3B). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

Inefficiencies arose in conventional composite laminate structures due to their discrete nature, exacerbated by self-inflicted constraints in the industry, including a perceived requirement that all composite laminate structures—and in particular the sub-laminate structures therein—have balanced and symmetric material characteristics; stated otherwise, they involve necessarily thick sub-laminate structures and mid-plane symmetry. Specifically, symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Although not problematic on their own, balanced laminates, like symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of specific plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/ or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result less than optimal laminate structures were used.

Improving upon conventional balanced and symmetric laminates, a continuous double-double sub-laminate structure was initially developed, as illustrated in FIGS. 2A-C. With reference now first to FIG. 2B, therein are illustrated respective fields 30/35 for double-double helix laminate structures. In the left-hand chart of tabular data, there is illustrated according to various embodiments, from 0 to 90 degrees and in 10° increments, the continuous double-double sub-laminate field 30. Stated otherwise, in being continuous every value can be met; there are no holes. As may be understood, by comparison to FIG. 1B (illustrating the legacy quad laminate discrete members), many more options are provided and in a manner that provides a truly continuous field of variables from which to select for construction of any particular element for a structural component or the like.

In the right-hand chart of FIG. 2B, the tabular data also illustrates, from 0 to 90 degrees and in 2° increments, a further granular level of an achievable continuous double-double sub-laminate field 35. It should be understood that this field is achieved in substantially the same manner as the continuous field 30 described above and also illustrated in FIG. 2B, but for the degree of granularity in field 35 being at increments of 2° between each ply within the sub-laminate structure. The result, as illustrated, is a collection 35 (by way of non-limiting example) that includes 2,116 continuous laminates 36 that may all be utilized for forming a desired sub-laminate structure. Notably, a continuous field is provided, as compared with the limited set of discrete members provided in conventional configurations. For many devices high precision in stiffness may be required. They include acoustic and high frequency situations which often require such precision.

FIG. 2C further illustrates the manner in which the degree of granularity involved in forming each collection of continuous double-double sub-laminates was expansive, whereby here there is illustrated a continuous field 40 (see right-hand chart), produced with angle increments of 1°. This field results, as illustrated in the right-hand chart of FIG. 2C, in a double-double laminate field 40 that contains 8,281 sub-laminate structures from which to choose, each having distinctive material characteristics associated therewith. It should be understood that the illustrated angle increments in these figures (e.g., 10°, 2°, 1°) are non-limiting examples; in view of the derivative nature of the double-double sub-laminate field (as detailed elsewhere herein), any angle increment can be selected, depending upon the degree of granularity that may be necessary to obtain a viable stiffness or strength match (as also detailed elsewhere herein) to a conventional laminate structure and/ or sub-laminate structure. In this manner, the double-double sub-laminate fields 30, 35, 40 should be understood as indicative of a continuous field of selectable ply angle and ply layer configurations, so as to best match conventional laminate structures having much greater thicknesses and/or to fill gaps of strength or stiffness values in such conventional structures due to the limited set of 47 discrete values under legacy quad-type configurations, as described previously herein.

Returning now to FIG. 2B, various advantages of the previously developed double-double field 30, 35 (depending on incremental degree chosen) may be understood. First, a continuous field of laminates [±Φ/±Ψ] (see FIG. 2C as well, illustrating the discrete and independent [±Φ] 42 and [±Ψ] 41 ply angle sets) is provided for selection therefrom, as contrasted with the discrete legacy quad collections (i.e., 47 options versus double-double's 8,281+ potential options). Zooming to achieve higher resolution (i.e., granularity) is conceptually easy via various embodiments of the double-double sub-laminate described herein and is shown on the right side of FIG. 2B. Equally important with granularity and this continuous field is the advantage that the sub-laminate thickness remains constant, at most being 4-ply; 2- or 1-ply configurations. Stiffness values may thus be also changed in a continuous fashion (i.e., no holes or gaps), simply by changing the angles within the continuous field, as may be understood with reference to FIG. 2A. This makes optimization possible, blending by changing one helix at a time feasible (as described elsewhere herein), and out-of-plane homogenization more easily achieved (as also described elsewhere herein). All these features—not available from the legacy quad-type structures—via the various embodiments described herein are now achievable, leading to stronger, tougher, fewer failure modes, lighter, lower cost structure, not to mention lower minimum gage, with natural mid-plane symmetry, and feasible automated layup.

Referring now also to FIG. 2A, therein is illustrated a chart of stiffness values 25 for the previously developed double-double laminate structures, illustrating the continuous field provided thereby, dependent upon the ply angle values [±Φ/±Ψ] of the double-double sub-laminate. For example, a double-double sub-laminate having four total plies of [±Φ=20°/±Ψ=60°] would have a stiffness value of 0.410. Stiffness values of each possible combination in the double-double sub-laminate field (see e.g., fields 30, 35, 40 of FIGS. 2B-C) are influenced (i.e., changed) by changing the angles of each pair of plies within each angle set (i.e., two sets within each sub-laminate, as will be detailed elsewhere herein). Notably, there within the previously developed structure 50% of each of ±Φ and ±Ψ. This provided a degree of simplicity, as compared to legacy quad members, where differing percentages of each angle must be utilized to alter stiffness values.

Notwithstanding the advantages realized via the previously developed double-double sub-laminate field, the discrete stacking sequences thereof, dependent upon the ply angle values [±Φ/±Ψ], retained challenges. For example, in certain circumstances, homogenized laminates remained difficult to analyze and design, with uncertainty as to resulting properties and, in some instances, resulting characteristics of materials less than desirable for a specific application. Thus, a need exists to provide laminate structures and methods of manufacturing with further flexibility, beyond that realized via the discrete stacking sequence applied to the previously developed double-double sub-laminate field.

BRIEF SUMMARY

It will be shown that, utilizing an expanded set of stacking sequences unique to the double-double sub-laminate field, laminate and sub-laminate thickness and homogenization can be further optimized. Upon homogenization, the inventive laminates and sub-laminates will be naturally symmetric, allowing for single ply drop (instead of two at a time to maintain mid-ply symmetry), and the difficulties in blending, optimization and manufacturing will be significantly mitigated. Laminates will be stronger and tougher, and customizable for specific applications in a straightforward and predictable manner. Finally, with thinner total laminates, the minimum gauge requirement is reduced, opening applications for components and devices not possible with prior laminate and sub-laminate configurations.

Various embodiments of the present invention are thus directed toward a sub-laminate module for use in forming a composite laminate structure. The sub-laminate module comprises: a first ply set containing a first ply layer oriented at a first angle and a second ply layer oriented at a second angle, the second angle being unequal the first angle; a second ply set containing a third ply layer oriented at a third angle and a fourth ply layer oriented at a fourth angle, the fourth angle being unequal the third angle; a first acute angle defined by a first difference between an absolute value of the first angle and the second angle; and a second acute angle defined by a second difference between an absolute value of the third angle and the fourth angle, the second acute angle being the same as the first acute angle, wherein the second ply layer is positioned adjacent the third ply layer and the second and third ply layers are both positioned intermediate the first and fourth ply layers, so as to define a staggered double-double helix sequence of the respective ply layers.

Various embodiments of the present invention are also directed toward a composite laminate structure comprising at least two sub-laminate modules according to the claimed sub-laminate modules described above. In these and other embodiments, the fourth ply of a first of the at least two sub-laminate modules is positioned, during stacking thereof, adjacent the first ply of a second of the at least two sub-laminate modules; and orientation values of [Φ/Ψ] are independent in each of the at least two sub-laminate modules.

Various embodiments of the present invention are also directed toward a composite laminate structure comprising a plurality of sub-laminate modules each comprising: a first ply set containing a first ply layer oriented at a first angle and a second ply layer oriented at a second angle, the second angle being unequal the first angle; a second ply set containing a third ply layer oriented at a third angle and a fourth ply layer oriented at a fourth angle, the fourth angle being unequal the third angle; a first acute angle defined by a first difference between an absolute value of the first angle and the second angle; and a second acute angle defined by a second difference between an absolute value of the third angle and the fourth angle, the second acute angle being the same as the first acute angle, wherein the second ply layer is positioned adjacent the third ply layer and the second and third ply layers are both positioned intermediate the first and fourth ply layers, so as to define a staggered double-double helix sequence of the respective ply layers.

In the above-described and other embodiments of the composite laminate structure, the plurality of sub-laminate modules comprises at least three distinct modules; the staggered double-double helix sequence of two or more of the sub-laminate modules are different relative to one another; and the staggered double-double helix sequence is selected from the group consisting of: a first staggered sequence of [Φ/−Ψ/−Φ/Ψ]; a second staggered sequence of [Φ/Ψ/−Φ/−Ψ]; a third staggered sequence of [Φ/−Ψ/Ψ/−Φ]; and a fourth staggered sequence of [Φ/Ψ/−Ψ/−Φ].

In the above-described and other embodiments of the composite laminate structure, the plurality of sub-laminate modules comprises at least four distinct modules stacked such that two modules are exterior facing and two modules are interior facing relative to a set of opposing outside surfaces of the composite laminate structure; the staggered double-double helix sequence of the two interior facing modules are different relative to the staggered double-double helix sequence of the two exterior facing modules; and the staggered double-double helix sequences are selected from the group consisting of: a first staggered sequence of [Φ/−Ψ/−Φ/Ψ]; a second staggered sequence of [Φ/Ψ/−Φ/−Ψ]; a third staggered sequence of [Φ/−Ψ/Ψ/−Φ]; and a fourth staggered sequence of [Φ/Ψ/−Ψ/−Φ].

In the above-described and other embodiments of the composite laminate structure, the staggered double-double helix sequences of the first and fourth sub-laminate modules define a first sequence of [Φ/−Ψ/−Φ/Ψ], the staggered double-double helix sequences of the second and third sub-laminate modules define a second sequence of [Φ/−Ψ/Ψ/−Φ], the second and third sub-laminate modules being interior and adjacent modules intermediate the exterior first and fourth sub-laminate modules, and a 45-degree difference separates the first and second sequences.

Various embodiments of the present invention are directed toward a method of manufacturing a sub-laminate module for use in forming a sub-laminate module, the method comprising the steps of: positioning a first ply set in a first orientation, the first ply set containing a first ply layer oriented at a first angle and a second ply layer oriented at a second angle, the second angle being unequal the first angle, a difference between an absolute value of the first and second angles defining a first acute angle there-between; positioning a second ply set in a second orientation different from the first orientation, the second ply set containing a third ply layer oriented at a third angle and a fourth ply layer oriented at a fourth angle, the fourth angle being unequal the third angle, a difference between the third and fourth angles defining a second acute angle there-between, the second acute angle being the same as the first acute angle; and stacking the second ply set adjacent the first ply set so as to define a staggered double-double helix sequence of the respective layers, wherein, when stacked, the second ply layer is positioned adjacent the third ply layer and the second and third ply layers are both positioned intermediate the first and fourth ply layers.

BRIEF DESCRIPTION OF THE FIGURES

Brief reference will now be made to the accompanying drawings, which are not necessarily drawn to scale, and wherein:

FIG. 1A, representative of prior art, shows a legacy quad conventional sub-laminate family, with focus upon a 10-ply configuration;

FIG. 1B, representative of prior art, shows the legacy quad conventional sub-laminate family of FIG. 1A, incorporating further 8- and 6-ply configurations alongside the 10-ply configuration;

FIG. 2A, representative of prior art, shows one master-ply stiffness component of all of the sub-laminates within the double-double sub-laminate family;

FIG. 3 shows a stress-strain relation of laminates in thickness-normalized and absolute values according to various embodiments described herein;

FIG. 6D shows a comparison between the first staggered configuration [Φ/−Ψ/−Φ/Ψ/] and a new second staggered configuration [Φ/Ψ/−Φ/−Ψ] according to various embodiments described herein;

FIG. 6H shows a comparison between the first staggered configuration [Φ/−Ψ/−Φ/Ψ/] and a new fourth staggered configuration [Φ/Ψ/−Ψ/−Φ] according to various embodiments described herein;

FIG. 11 shows a single-double configuration, comparing the paired configuration with the first staggered configuration according to various embodiments described herein.

Figure 2B:
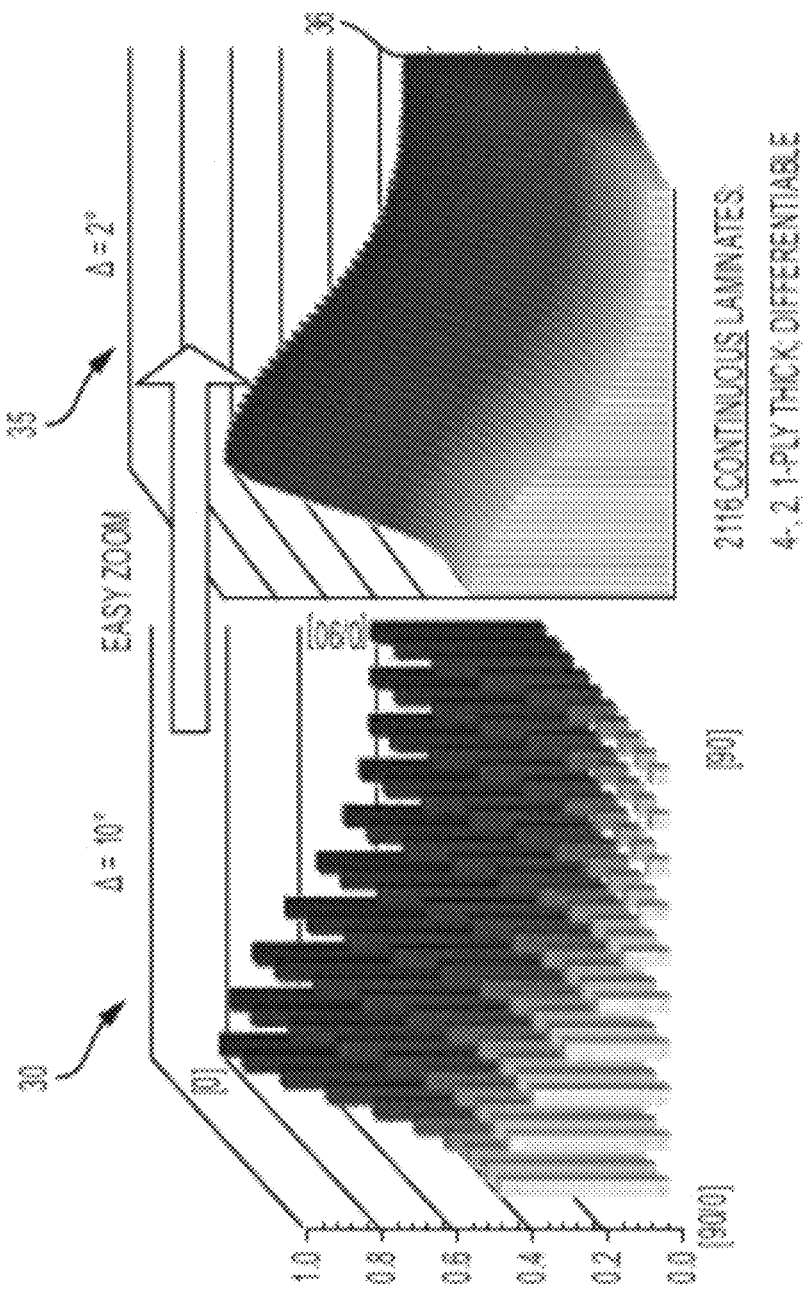
FIG. 2B, representative of prior art, shows two three-dimensional representations of the double-double sub-laminate family at angle increments of 10 and 2 degrees, respectively.

Additional details regarding various features illustrated within the figures are described in further detail below.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Conventional Laminate Characteristics

As mentioned previously herein, conventional legacy quad laminates were made of collections of [0], [±45] and [90] ply configurations. These laminates were discrete and not possible to interpolate due to a variety of self-inflicted constraints (e.g., fixed angles, symmetry, etc.). To have more directional properties, plies had to be added to their sub-laminates, which in turn increased weight and decreased design flexibility of laminate structures due to thickness. Nevertheless, to achieve somewhat desirable material characteristics of legacy laminates, necessarily at least 6-, 8- and 10-ply thick (and oftentimes thicker) sub-laminates were utilized. When laminates with mid-plane symmetry are required and met, their thicknesses with 6- to 10-ply sub-laminates would be doubled, tripled or more. Such thick sub-laminates were, in addition to being undesirably heavy in weight, delamination prone, which also made blending, ply drop, and ply layup difficult; still further material characteristics could oftentimes not be optimized (to, for example, desired characteristics) due to limitations imposed by the discrete number of ply configurations available in the field (see field 1 illustrated in FIG. 1A). As a result, there are gaps between laminate stiffness and strength that cannot be bridged using conventional legacy quad laminates. Multiple failure modes and complexity in manufacturing thus existed.

These various considerations involved with conventional legacy quad laminates may be understood with reference again to FIG. 1A, wherein the legacy quad field 1 for a 10-ply thick sub-laminate 2 is illustrated. Once more, conventional nomenclature is utilized as $[0_p/90_q/\pm45_r]$ to identify the sub-laminate, wherein p represents the number of 0° ply layers, q represents the number of 90° ply layers, and r represents the number of ±45° ply layers. In the specific example illustrated 10 total plies are provided. In example discrete sub-laminate 3A, the sub-laminate is formed with 80% 0° ply layers, 20%±45° ply layers and no 90° ply layers (i.e., for the 10-ply configuration illustrated, eight 0° ply layers, two ±45° ply layers and no 90° ply layers). Another discrete sub-laminate 3B is also highlighted, wherein the sub-laminate is formed with 70% 0° ply layers, 20%±45° ply layers and thus 10% 90° ply layers (i.e., for the 10-ply configuration illustrated, seven 0° ply layers, two ±45° ply layers and one 90° ply layers). As another non-limiting example, if stiffness with 80% 0°, 10% 90° ply and 10%±45° ply is desired, the sub-laminate will have to be 20 ply thick. Remaining characteristics for the other discrete twenty-four (24) sub-laminates available (i.e., each dot or anchor in FIG. 1A) may be extrapolated from these examples.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1B). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

FIG. 1C depicts a set of three charts, namely illustrating a sub-set of the values of one stiffness component $A_{11}^*$ with respect to the 10-ply sub-laminate 7 of FIG. 1A, the 8-ply sub-laminate 8 of FIG. 1B, and the 6-ply sub-laminate 9 of FIG. 1B. As may be understood from these respective charts, the sub-laminates exhibit the greatest stiffness (i.e., the highest stiffness values) where the highest percentage of 0° ply layers are used. For example, in the subset illustrated in FIG. 1C, the stiffness value (0.763) is highest for the 10-ply sub-laminate where 80% 0° ply layers are used, accompanied by 20%±45° ply layers. Another notable example, which will be returned to during discussion of FIG. 4D elsewhere herein is the stiffness value (0.321) of a "square symmetric" sub-laminate having 10-ply layers, with the "square symmetric" nomenclature—accompanying 10% 0° ply layers are used, accompanied by 80%±45° ply layers—representing that equal stiffness exists along both the x- and the y-axes of any so defined sub-laminate module or structure. This class of sub-laminates is particular useful, due to its having exact replacement of a legacy quad by double-double. For non-square symmetric laminate structures, the replacement is nevertheless still an approximate match.

The collection 15 of FIG. 1C is also informative in terms of guidance of the laminate design without use of sub-laminates, as mentioned previously herein. As a non-limiting example, the entire laminate may be designed to satisfy the percentages of the quad ranges in 0°, ±45° and 90°. Beyond the requirements of symmetry and ply grouping to larger than three (again, as mentioned previously herein), every ply stacking selection is subjective, meaning there is no scientific or mathematical analysis involved, but for having well dispersed plies that would facilitate ply drop and blending. Unfortunately, this approach often leads to multiple internal fiber discontinuities, ply wrinkling, and other defects that can be sources of multiple damage initiation sites. Double-double laminates and sub-laminate structures, in contrast, achieve structures having no internal defects, due in part to the continuous field of options provided (see FIGS. 2A-C, as previously discussed herein). In this context, having thin sub-laminates with constant thickness makes blending, ply drop, and manufacturing much simpler than the quad laminates in one piece or in thick sub-laminates; however, constraints and challenges have remained.

Notably, throughout the above discussion and illustrations it should be understood that the core problem of the legacy quad laminate design is that all sub-laminates are discrete. As a result, even with utilization of 6-, 8-, and 10-ply configurations, there are no comprehensive connections among all 47 members in the sub-laminate. Thus, beyond the remaining "holes" where certain material characteristics may remain unachievable, blending between different laminates (i.e., from adjoining elements) has no standard solution. This is because there is no continuous connection between the two different laminates, for example where each laminate is a different discrete configuration. There will be thousands of fiber discontinuities inside each laminate. They are the sources of multiple failures under static and fatigue loading. Tapering is also difficult due to the lack of continuity. As a result, laminated structures using legacy quad oftentimes cannot be optimized with respect to material characteristics, and ply stacking (including tapering and blending) is extremely complicated, making automated layup procedures not only costly, but also necessarily involving compromises in material characteristics and thus structural integrity, possibly leading to multiple material failure modes that are not possible to predict (at least in part due the complexities and uncertainties involved between the discrete dots or anchors).

Double-Double Laminate Characteristics

The continuous field of double-double sub-laminate structures described herein (see, as previously developed, with reference to FIGS. 2A-C described herein-above) achieves sub-laminates with at most 4-ply thick structures; even thinner 2- and 1-ply thick configurations are obtainable. Throughout various embodiments, the ply angles are also continuous, making blending of different laminates and their optimization achievable. Sub-laminate thickness remains constant. For directional property, the angles of each double helix can change continuously to the desired values. Plies are not added like the case of legacy quad family. As a result, far fewer failure modes (and virtually no unpredictable failure modes) are encountered, and automated layup procedures may be conducted in relative simplistic fashions. All of these and still other advantages lead to much simpler and lighter structures that are also better optimized for purposes of efficiency and accuracy, notably improvements given that the further above-detailed degree of uncertainty with conventional legacy quad laminate structures is becoming ever-increasingly unacceptable across multiple industries. Having thinner sub-laminates (4 of less versus 12 to 20) the minimum gage requirement is lowered. Many electronic and medical devices can now use composite laminate. This is not possible if laminates must be multiples of 12 to 20 plies.

1. Originally Utilized Stacking Sequence

Figure 2C:
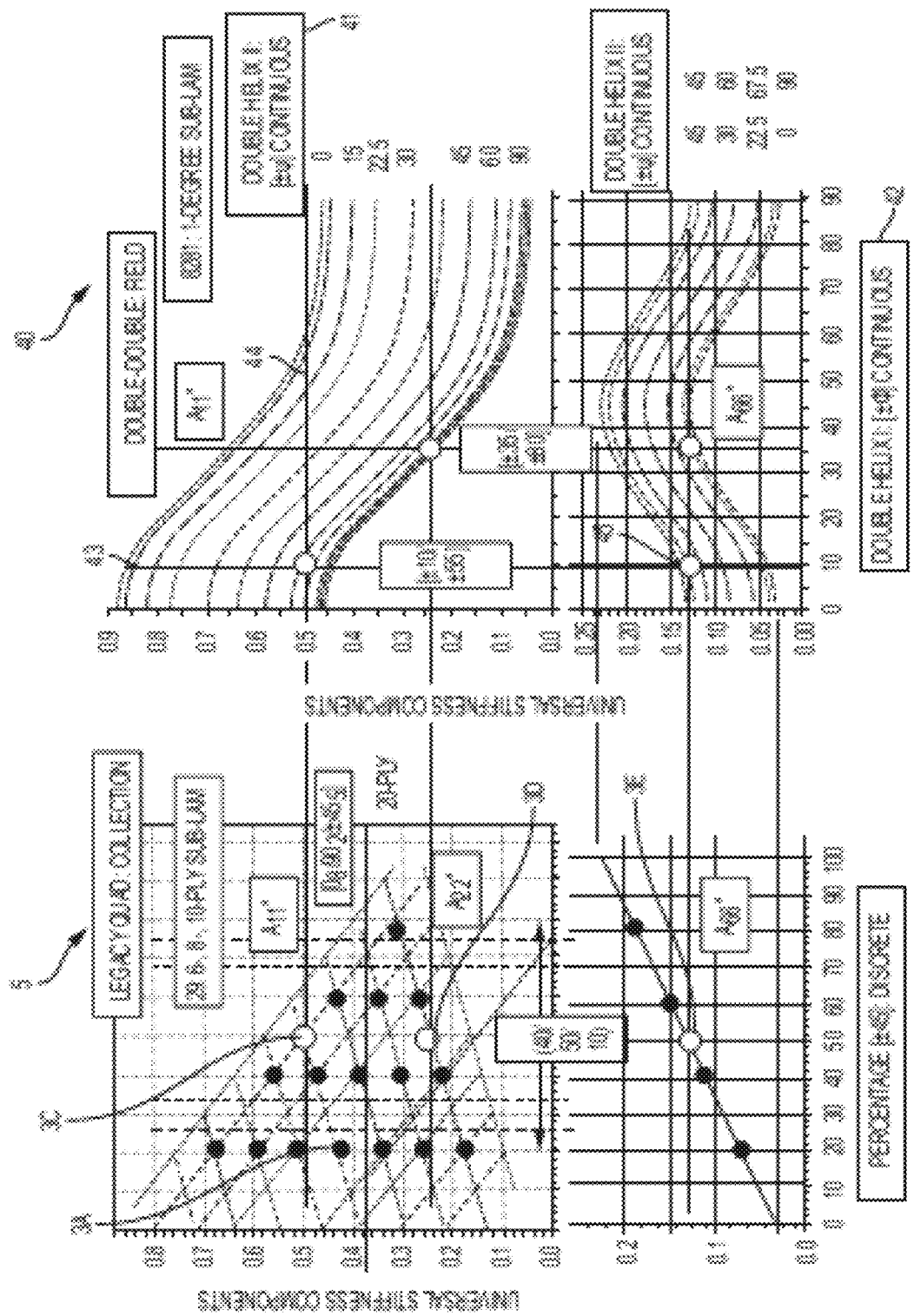
FIG. 2C, representative of prior art, shows aligned charts identifying viable replacements within the double-double sub-laminate field for anchors within the legacy quad sub-laminate field.

FIG. 2C further illustrates the manner in which the degree of granularity involved in forming each collection of continuous double-double sub-laminates is potentially indefinite, whereby here there is illustrated a continuous field 40 (see right-hand chart), produced with angle increments of 1°. This field results, as illustrated in the right-hand chart of FIG. 2C, in a double-double laminate field 40 that contains 8,281 sub-laminate structures from which to choose, each having distinctive material characteristics associated therewith. It should be understood that the illustrated angle increments in these figures (e.g., 10°, 2°, 1°) are non-limiting examples; in view of the derivative nature of the double-double sub-laminate field (as detailed elsewhere herein), any angle increment can be selected, depending upon the degree of granularity that may be necessary to obtain a viable stiffness or strength match (as also detailed elsewhere herein) to a conventional laminate structure and/or sub-laminate structure. In this manner, the double-double sub-laminate fields 30, 35, 40 should be understood as indicative of a continuous field of selectable ply angle and ply layer configurations, so as to best match conventional laminate structures having much greater thicknesses and/or to fill gaps of strength or stiffness values in such conventional structures due to the limited set of 47 discrete values under legacy quad-type configurations, as described previously herein.

Returning now to FIG. 2B, a continuous field of laminates [±Φ/±Ψ] (see FIG. 2C as well, illustrating the discrete and independent [±Φ] 42 and [Ψ] 41 ply angle sets) is provided for selection therefrom, as contrasted with the discrete legacy quad collections (i.e., 47 options versus double-double's 8,281+ potential options). Zooming to achieve higher resolution (i.e., granularity) is conceptually easy via various embodiments of the double-double sub-laminate described herein and is shown on the right side of FIG. 2B. Equally important with granularity and this continuous field is the advantage that the sub-laminate thickness remains constant, at most being 4-ply; 2- or 1-ply configurations are, however, also possible if folding is incorporated. Stiffness values may thus be also changed in a continuous fashion (i.e., no holes or gaps), simply by changing the angles within the continuous field, as may be understood with reference to FIG. 4A. Notwithstanding this flexibility and opportunities for optimization associated therewith, a remaining constraint for purposes of homogenization and achieving specifically desired material characteristics of formed laminates remained the discrete stacking sequence, whereby specific ply angle sets were required. These ply angle sets, referenced generally as [±Φ] 42 and [Ψ] 41 resulted in laminate and sub-laminate structures having limitations as to the sequence of the discrete plies when stacked relative to one another.

2. Improved Stacking Sequences and Applications Therefor

Via the various embodiments described herein, multiple and improved stacking sequence configurations have been discovered for double-double laminate and sub-laminate structures, beyond the discrete (i.e., paired) [±Φ] and [Ψ] sequence previously utilized. To understand the implications of eliminating this discrete sequence, it is informative to revisit homogenization and the advantages associated therewith.

Figure 3:
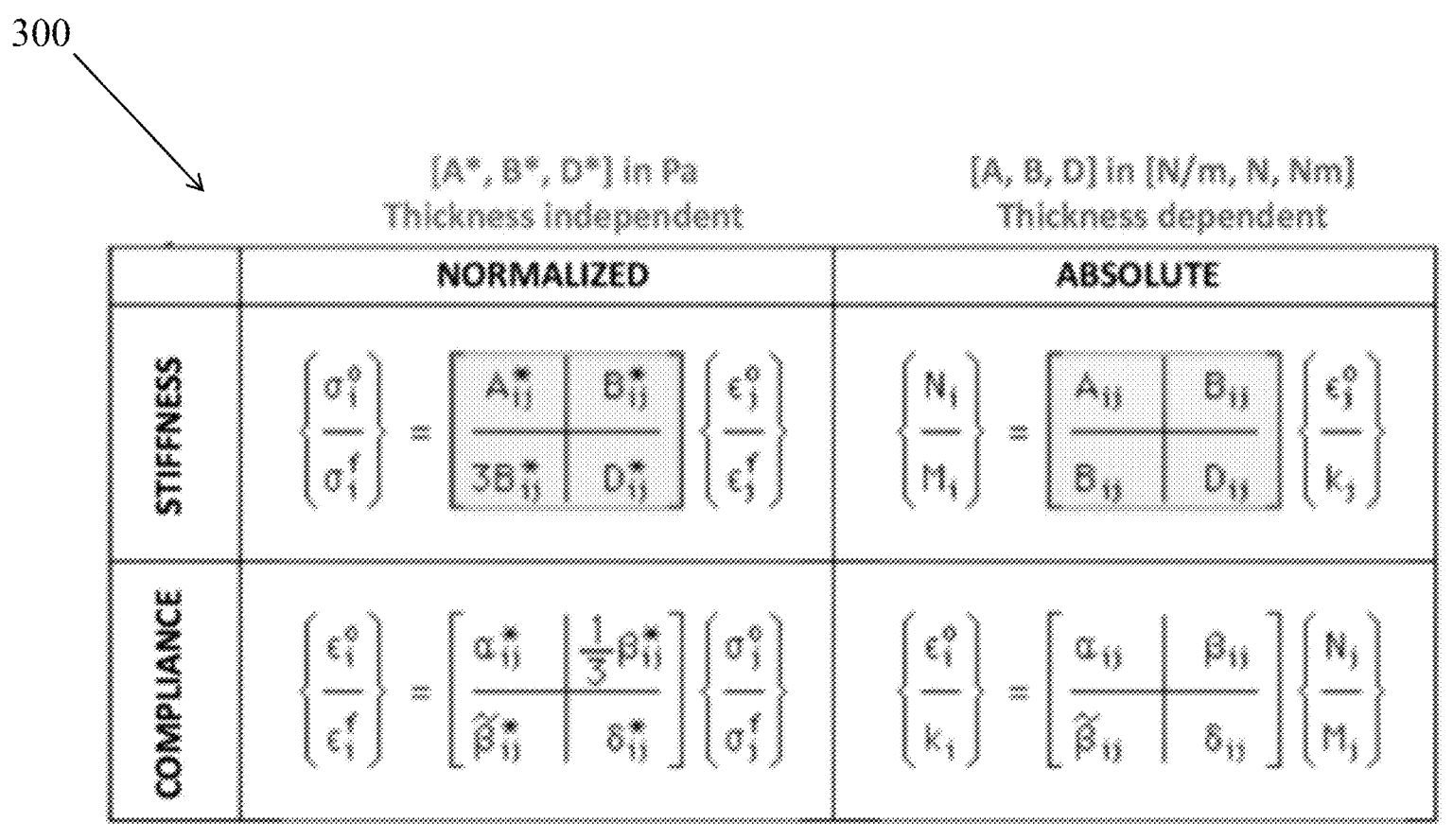

For purposes of context and understanding, consider firstly FIG. 3 containing table 300, which shows a stress-strain relation of laminates in thickness-normalized and absolute values according to various embodiments described herein. As mentioned, the double-double family of laminates and sub-laminate structures is a balanced and orthotropic replacement of conventional legacy quad configurations. The double-double replacement is advantageous for multiple reasons, among them the ability to achieve homogenization with less material (i.e., fewer layers, better ply drops for tapering, etc.). Homogenization of a laminate is defined by two conditions set forth in Equation 1 below:

$$[A^*]=[D^*];[B^*]=0$$

where: $[A^*]=[A]/h$; $[D^*]=12[D]/h^3$; $[B^*]=2[B]/h^2$; and h=laminate thickness.

Figure 4:
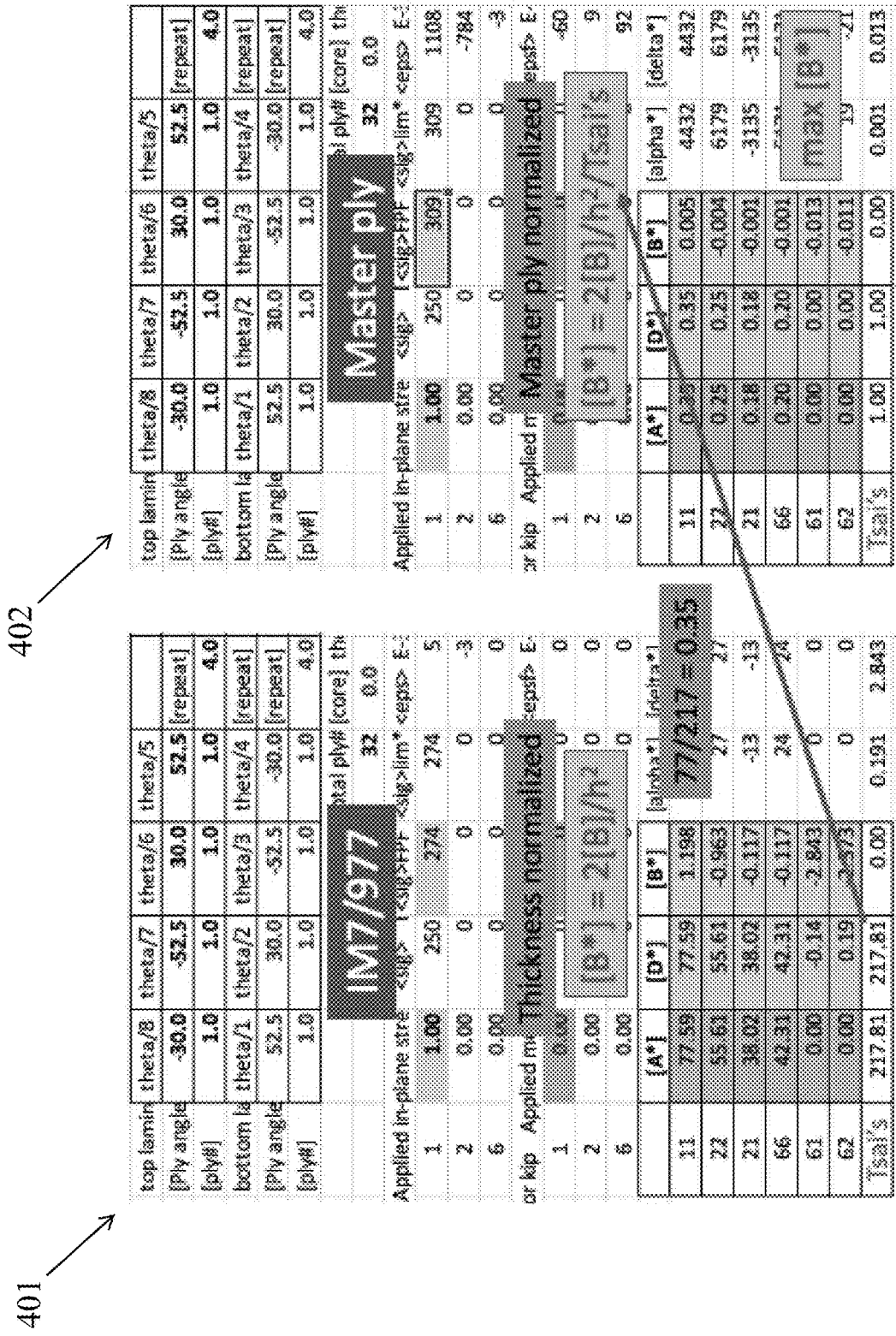
FIG. 4 shows a normalization of thickness and master ply according to various embodiments described herein.

According to various embodiments, with reference now also to FIG. 4, the constant [B] may be normalized using thickness or master ply stiffness values. Notably, when master ply stiffness values are used, the resulting constants are fractions of Tsai's modulus; this can be compared to thickness-based normalization calculated in table 401 on the left side of FIG. 4. In table 402 on the right side of FIG. 4, where [B] is normalized to [B*] based upon master ply stiffness, the resulting constant may be, in certain circumstances, sufficiently small to ignore. Relative to stacking sequence determination and/or optimization, as described herein-below, two criteria will be used: one when $[B^*] \leq 1$ percent; the other, $[B^*] \leq 2$ percent. The reason for these limits is based on the coefficient of variations of master ply that is normally between these two values.

Figure 5:
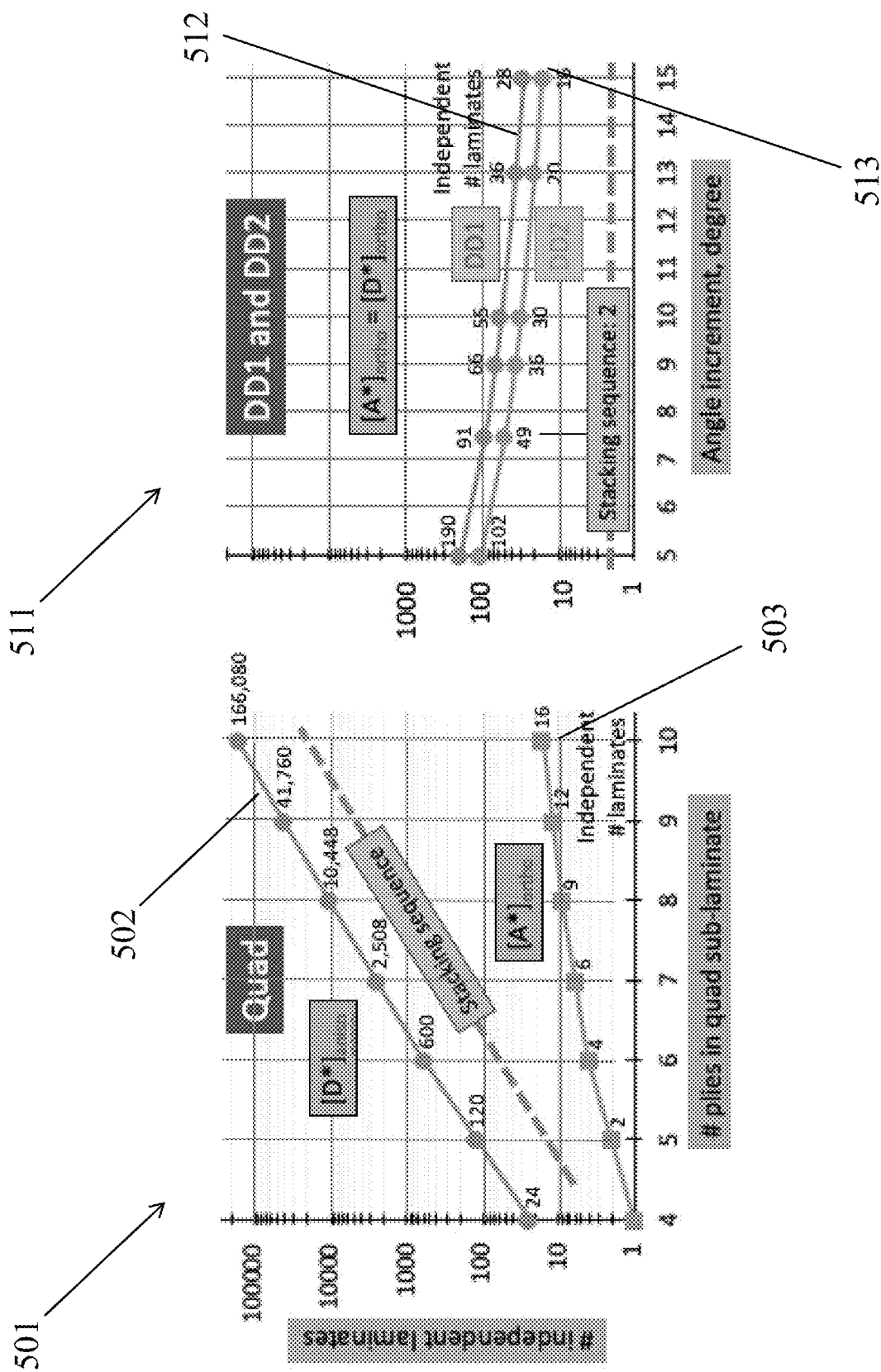
FIG. 5 shows a number of stacking sequences in legacy quad conventional sub-laminates and in certain double-double sub-laminates according to various embodiments described herein.

Referencing also FIG. 5, it may be understood from chart 501 that according to various embodiments there may be thousands of stacking sequences 502 in conventional legacy quad configurations, due largely to the strict requirements thereof for symmetry and balance—greatly increasing the required independent number of plies 503. For example, in one legacy quad embodiment having sixteen (16) independent laminate plies, a corresponding set of 166,080 independent stacking sequences are possible. This provided great uncertainty as to material characteristics, as but one non-limiting examples of challenges with legacy quad (see discussion previously herein).

By way of contrast, remaining with FIG. 5, it may be understood from chart 511 that according to various embodiments there were conventionally, at most, two (i.e., paired) stacking sequences 512 (DD1) and 513 (DD2) for double-double laminate structures. The implications of this may be understood by considering the data required for sufficient accuracy of simulation models for laminate structures with characteristics predictably desirable. As an example, to distinguish between 10,000 members of a population, the accuracy of an exemplary simulation model and its associated data would require at least five (5) significant figures. For laminate composites, however, available data is generally no better than three (3) significant figures, promoting possibility for inaccuracy and inefficiency.

With the above-noted three (3) significant figure limitation, conventionally there was no impetus to consider any legacy quad laminate structures having more than six (6) ply sub-laminates (600 total members in a family, as illustrated in chart 501). As a result, there are only four laminates in this legacy quad sub-family ([0/±45/90$_3$]; [0$_2$/±45/90$_2$]; [0$_3$/±45/90]; [0/±45$_2$/90])—but subject to uncertainty due to a near-infinite number of stacking sequences 502. By way of contrast, double-double laminates and sub-laminate structures will always have a choice of at least 91 family members (see DD1 512 stacking sequence in chart 511); with only one other alternative conventionally with DD2 513 stacking sequence.

According to various embodiments, though, a significant advantage of double-double laminates and sub-laminate structures lies in available permutations of the paired stacking sequences (DD1 512, DD2 513). Specifically, six stacking sequence permutations display advantageous results related to material characteristics for laminates and sub-laminate structures. These include: a first paired sequence 601 (see FIG. 6A) of [Φ/−Φ/Ψ/−Ψ]; a second paired sequence 602 (see FIG. 6A) of [Φ/−Φ/−Ψ/Ψ]; a first staggered sequence 603 (see FIG. 6B) of [Φ/−Ψ/−Φ/Ψ]; a second staggered sequence 604 (see FIG. 6D) of [Φ/Ψ/−Φ/−Ψ]; a third staggered sequence 605 (see FIG. 6F) of [Φ/−Ψ/Ψ/−Φ]; and a fourth staggered sequence 606 (see FIG. 6H) of [Φ/Ψ/−Ψ/−Φ]. To determine how many repeats of each of these stacking sequences is required for homogenization, the definition thereof is set by the value of the largest absolute component of [B*] and [A]*-[D]*, as previously defined herein. As one example, conditions to reach homogenization may be [B*]=0 and [A]*=[D]*.

The homogenization results according to various embodiments of the six sequences may be understood in each of FIGS. 6A, 6B, 6D, 6F, and 6H, respectively. Of note, as would be expected for pairing-based sequences, the results of the first and second paired sequences 601/602 are duplicative of one another, resulting in a total of five independent stacking sequences 601/602, 603, 604, 605, 606, respectively. Those sequences requiring the fewest number of repeats (i.e., ply layers) to achieve homogenization are the first staggered sequence 603 and the third staggered sequence 605. Details surrounding this are described hereinbelow.

Figure 6A:
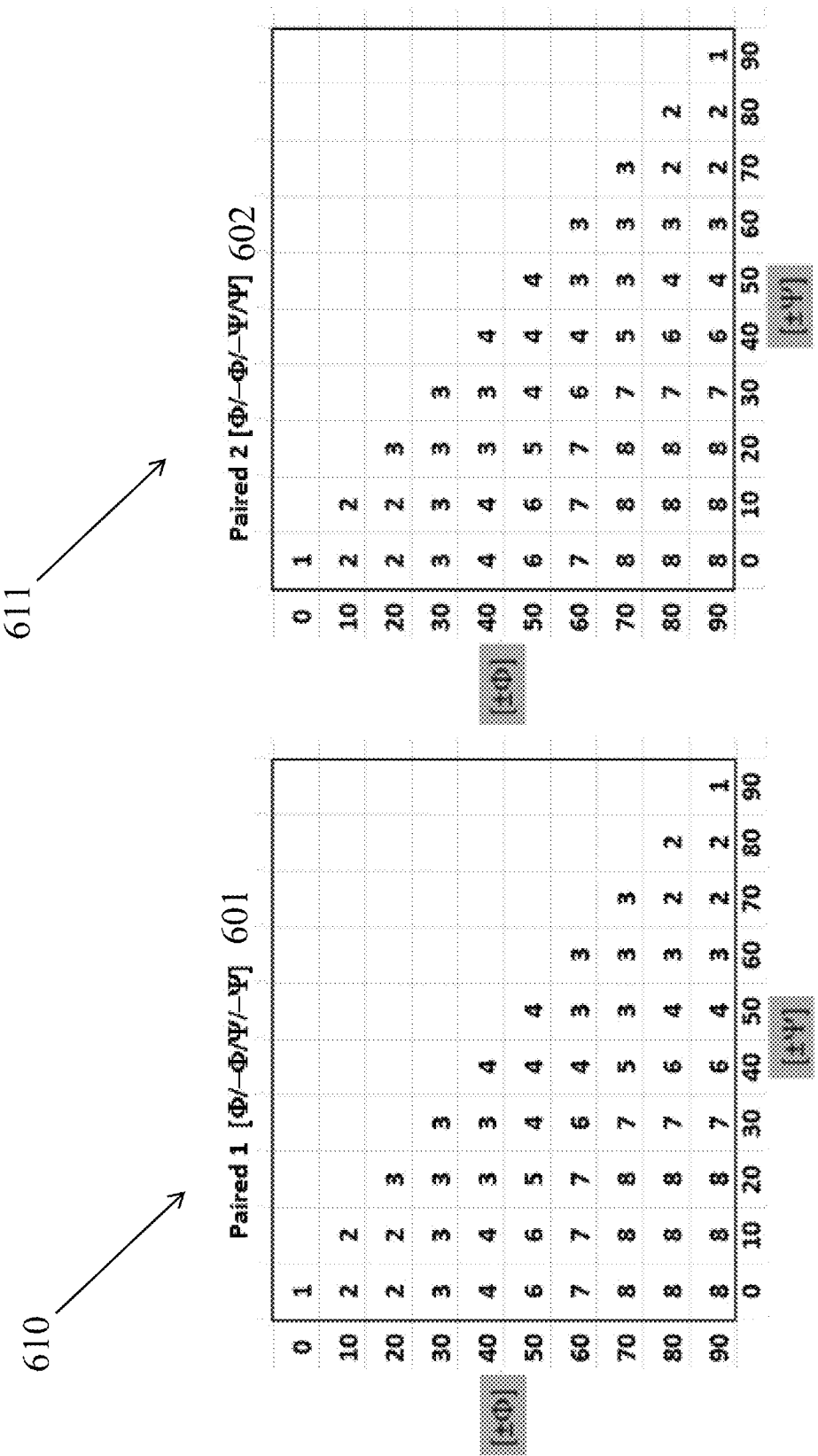
FIG. 6A shows on the left a first paired [±Φ/±Ψ] stacking sequence or configuration of certain double-double sub-laminates, with a second paired stacking sequence or configuration [Φ/−Φ/−Ψ/+Ψ] illustrated on the right according to various embodiments described herein.

Referencing FIG. 6A first, illustrated therein in table 610 is the first paired [±Φ/±Ψ] stacking sequence or configuration of double-double sub-laminates, with the second paired [Φ/−Φ/−Ψ/−Ψ] stacking sequence or configuration illustrated in table 611 according to various embodiments. Considered together, these graphs illustrate that the minimum number of repeats (i.e., ply layers) to reach homogenization ranges from 1 to 8, dependent on respective values of [Φ/Ψ]. While angular orientations in the 40- to 50-degree range align with the average values, as expected the extremes are associated with opposing or aligned angles at either 0- or 90-degrees. Further, both paired configuration stacking sequences illustrated in FIG. 6A return the same results, representative of the ordering—provided it is in a paired structure—is not an independent variable for purposes of homogenization (and material characteristics derived therefrom). In other words, the first and second paired stacking sequences [±Φ/±Ψ] and [Φ/−Φ/−Ψ/Ψ] are duplicates; neither providing differing repeat values relative to the other purposes of optimization of thickness and/or other material characteristics of formed laminates and sub-laminate structures.

Figure 6B:
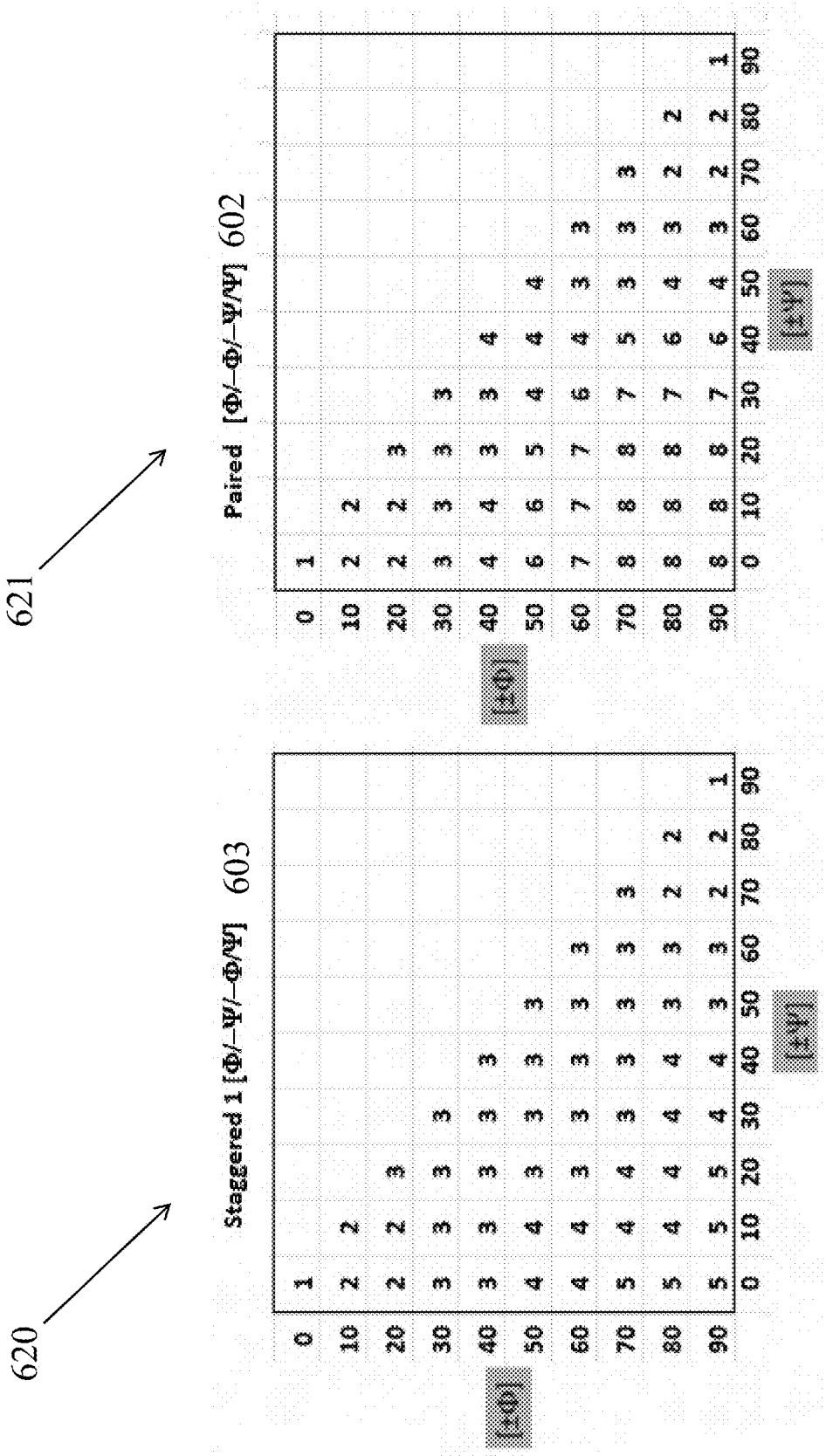
FIG. 6B shows a comparison between a new first staggered configuration [Φ/−Ψ/−Φ/Ψ] and the new paired configuration [Φ/−Φ/−Ψ/+Ψ] according to various embodiments described herein.

Reference is next made to FIG. 6B, illustrating a comparison between the first staggered configuration 603 [Φ/−Ψ/−Φ/Ψ] and the second paired configuration 602 [Φ/−Φ/+Ψ/−Ψ] according to various embodiments. By way of comparison of table 620 and table 621, the second paired stacking sequence 602 or configuration needs more repeats for homogenization than the first staggered stacking sequence 603, across a large number of the angular options illustrated. As a non-limiting example, compared to the 8 repeats or layers required for homogenization of a paired configuration of [80/−80/20/−20], that same set of angles staggered in a sequence of [80/−20/−80/20] requires only 4 repeats or layers for homogenization. In this embodiment alone, homogenization (and desirable material characteristics of laminate structures related thereto) is achieved with half the ply layers and thus material/thickness/weight/and the like.

Figure 6C:
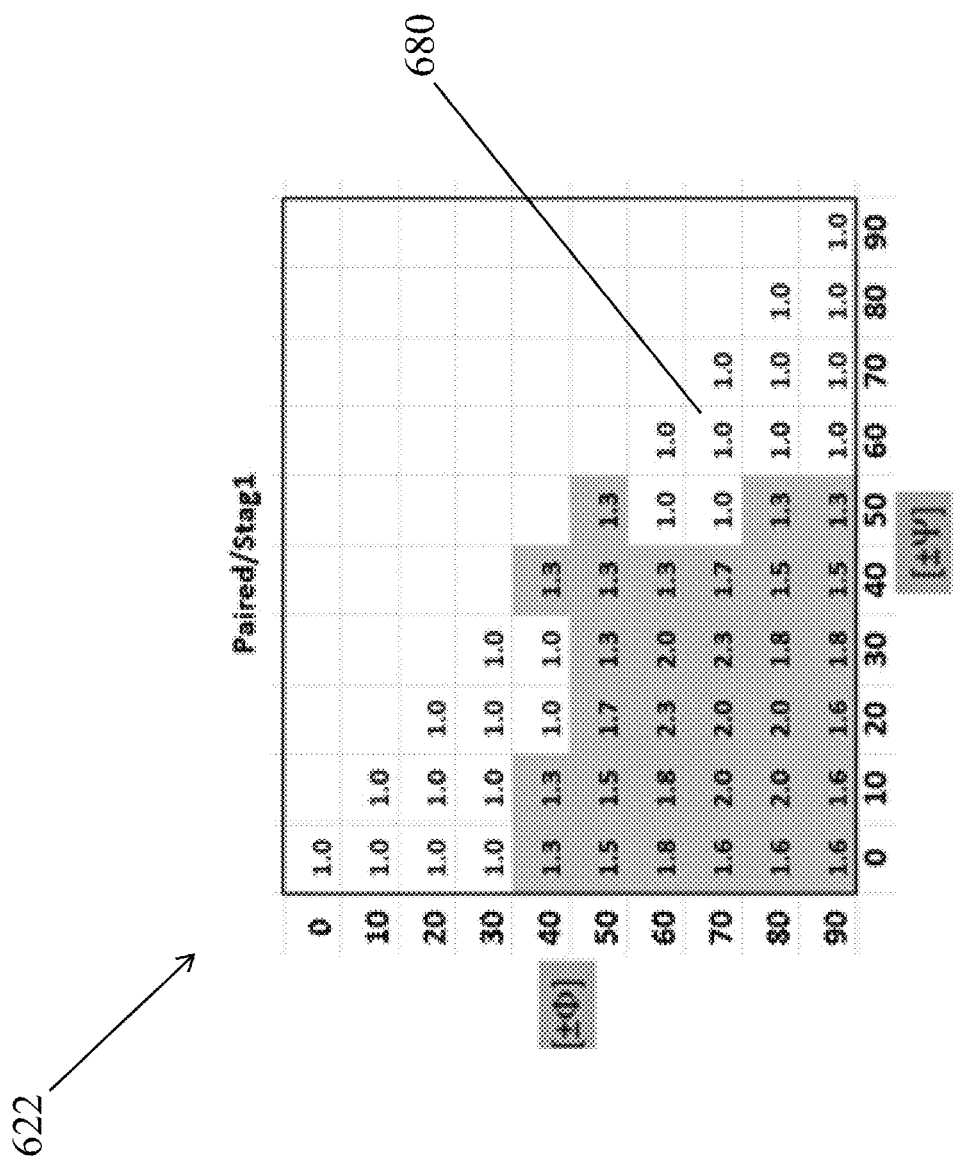
FIG. 6C shows an overlaid comparison between the first staggered configuration [Φ/−Ψ/−Φ/Ψ/] according to various embodiments described herein and the original and new paired [±Φ/±Ψ] stacking sequences.

The enhancement factor 680 of the first staggered configuration 603 relative to the second paired configured 602 may be further appreciated, according to various embodiments, with reference to table 622 of FIG. 6C. In this figure, the repeat values for respective sequences or configurations under comparison are overlaid and divided relative to one another. For the sequence of [80/−20/−80/20], an enhancement factor 680 of 2.0 is visible, representative of the repeat values for the second paired stacking sequence 602 divided by the repeat values for the first staggered stacking sequence 603. Enhancement factor 680 values greater than one indicate a faster achievement of homogenization, which in turn may realize other advantageous characteristics of a formed laminate structure, including reduced thickness and/or weight, or the like. As other illustrated and non-limiting examples of FIG. 6C, the sequences of [60/−20/−60/20] and [70/−30/−70/30] achieve homogenization with less than half the repeats, indicated by an enhancement factor 680 of 2.3. Generally, where the angle between [±Φ/±Ψ] for the first staggered sequence 603 greater than 20 degrees, improvements are realized as compared to the paired sequence or configurations.

Figure 6D:
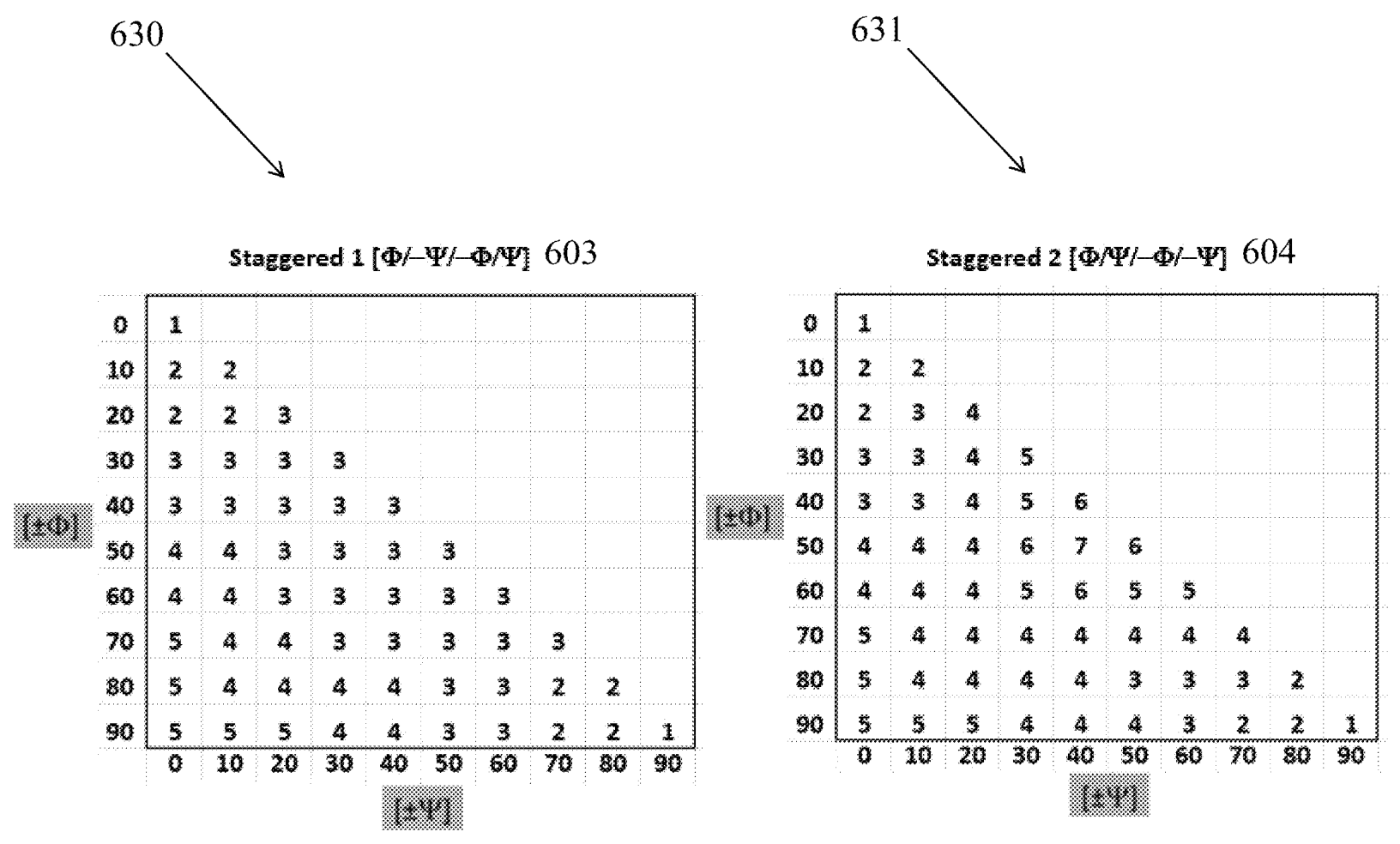

Reference is next made to FIG. 6D, illustrating a comparison between the first staggered configuration 603 [Φ/−Ψ/−Φ/Ψ/] and the second staggered configuration 604 [Φ/Ψ/−Φ/−Ψ] according to various embodiments. By way of comparison of table 630 and table 631, the second staggered stacking sequence 604 or configuration needs, in certain angular orientations, more repeats for homogenization than the first staggered stacking sequence 603. As a non-limiting example, compared to the three (3) repeats or layers required for homogenization of the first staggered stacking sequence 603 of [60/−40/−60/40], that same set of angles staggered in a sequence of [60/40/−60/−40] requires six (6) repeats or layers for homogenization. In this embodiment of the first staggered stacking sequence 603 alone, homogenization (and desirable material characteristics of laminate structures related thereto) is achieved with half the ply layers and thus material/thickness/weight/and the like. Of course, in certain embodiments where the second staggered sequence has values largely aligned with that of the first staggered sequence, for example with the sequence 604 of [70/20/−70/−20] of FIG. 6D, a repeat of four (4) remains an improvement of the same angular combination applied to either paired sequence 601/602 (see FIG. 6A) of [70/−70/ 20/−20], requiring eight (8) repeats.

Figure 6E:
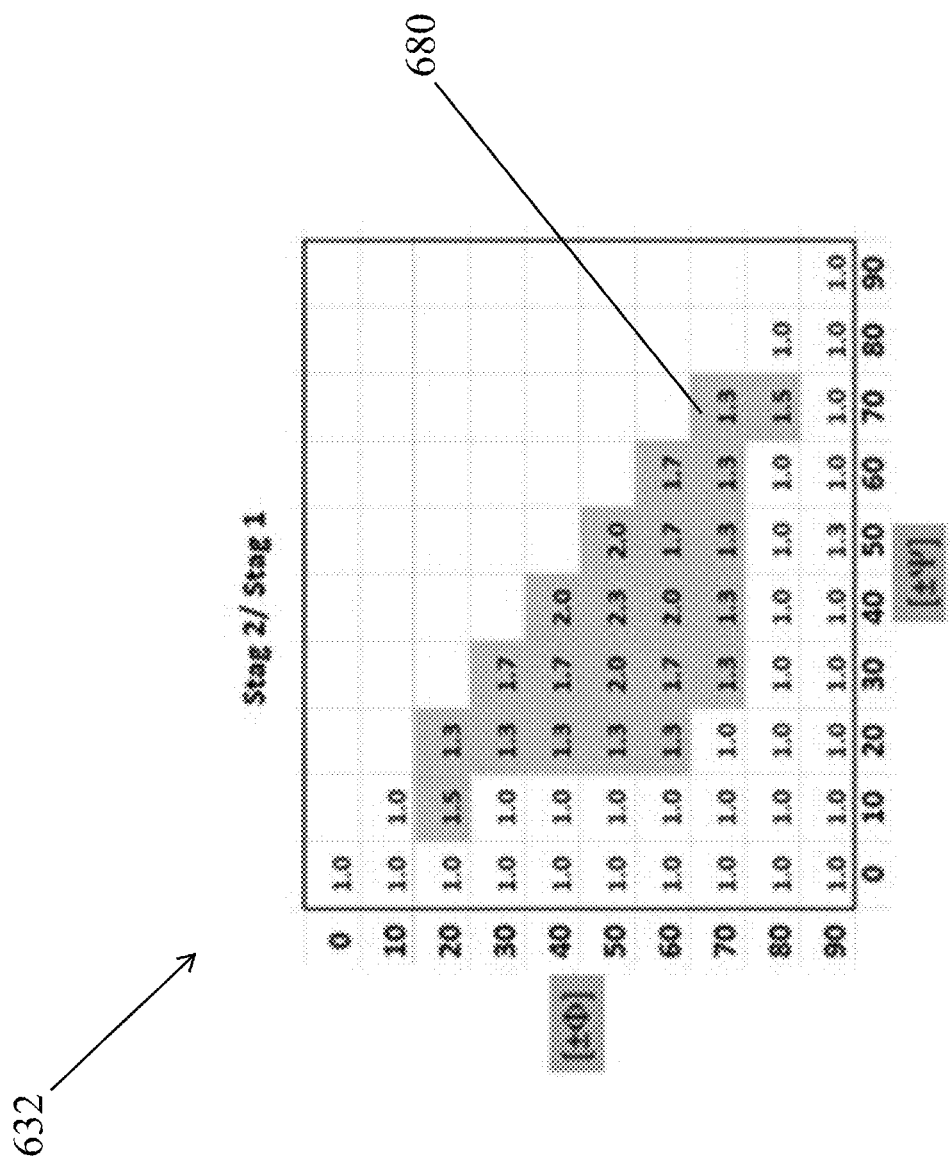
FIG. 6E shows an overlaid comparison between the first staggered configuration [Φ/−Ψ/−Φ/Ψ/] and the new second staggered configuration [Φ/Ψ/−Φ/−Ψ] according to various embodiments described herein.

The enhancement factor 680 of the first staggered configuration 603 relative to the second staggered stacking sequence 604 may be further appreciated, according to various embodiments, with reference to table 632 of FIG. 6E. In this figure, the repeat values for respective sequences or configurations under comparison are overlaid and divided relative to one another. For the sequences of [50/30/−50/− 30]; [50/40/−50/−40]; [50/50/−50/−50]; [40/40/−40/−40]; [60/40/−60/−40] all have enhancement factors 680 of 2.0 or greater. Once again, these enhancement factor 680 values greater than one indicate a faster achievement of homogenization, which in turn may realize other advantageous characteristics of a formed laminate structure, including reduced thickness and/or weight, or the like. As a general observation, for many of the selectable angular option as between [±Φ/±Ψ], the second staggered sequence 604 requires more repeats (and thus greater thickness, weight, and the like), as compared to the first staggered sequence 603. In other angular options, though, as mentioned, the second staggered sequence 604 achieves homogenization with a lesser number of repeats than that required via the paired stacking sequences 601/602, thus providing remaining advantages as well.

Figure 6F:
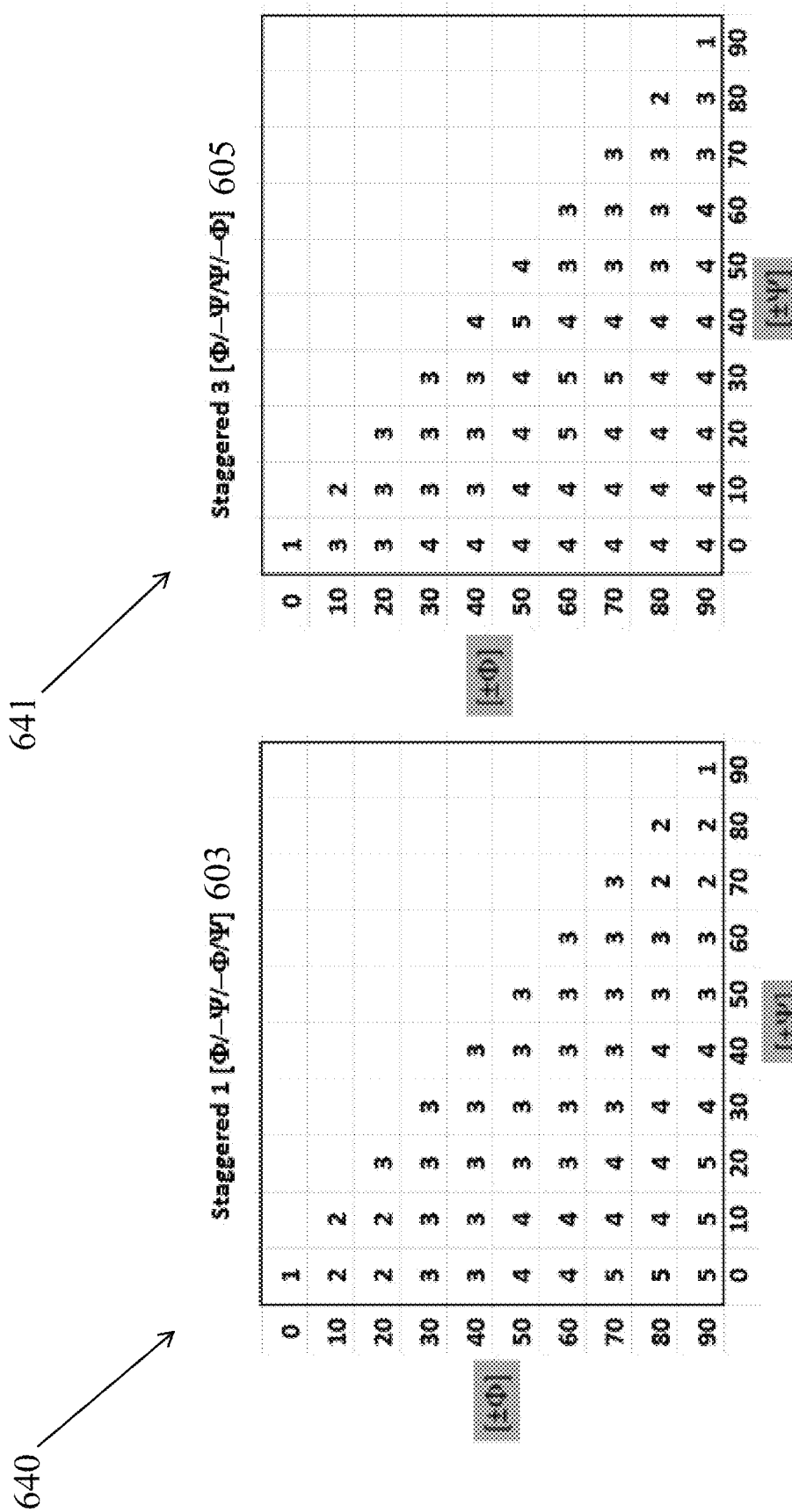
FIG. 6F shows a comparison between the first staggered configuration [Φ/−Ψ/−Φ/Ψ/] and a new third staggered configuration [Φ/−Ψ/Ψ/−Φ] according to various embodiments described herein.

Reference is next made to FIG. 6F, illustrating a comparison between the first staggered configuration 603 [Φ/− Ψ/−Φ/Ψ/] and the third staggered configuration 605 [Φ/− Ψ/Ψ/−Φ] according to various embodiments. By way of comparison of table 640 and table 641, the third staggered stacking sequence 605 or configuration needs, in certain angular orientations, more repeats for homogenization than the first staggered stacking sequence 603. As a non-limiting example, compared to the three (3) repeats or layers required for homogenization of the first staggered stacking sequence 603 of [60/−30/−60/30], that same set of angles staggered in a sequence of [60/−30/30/−60] requires six (5) repeats or layers for homogenization. In this embodiment of the first staggered stacking sequence 603 alone, homogenization (and desirable material characteristics of laminate structures related thereto) is achieved with nearly half the ply layers and thus material/thickness/weight/and the like. Of course, in certain embodiments where the second staggered sequence has values largely aligned with that of the first staggered sequence, for example with the sequence 605 of [70/−20/−20/−70] of FIG. 6F, a repeat of four (4) remains an improvement of the same angular combination applied to either paired sequence 601/602 (see FIG. 6A) of [70/−70/ 20/−20], requiring eight (8) repeats.

Figure 6G:
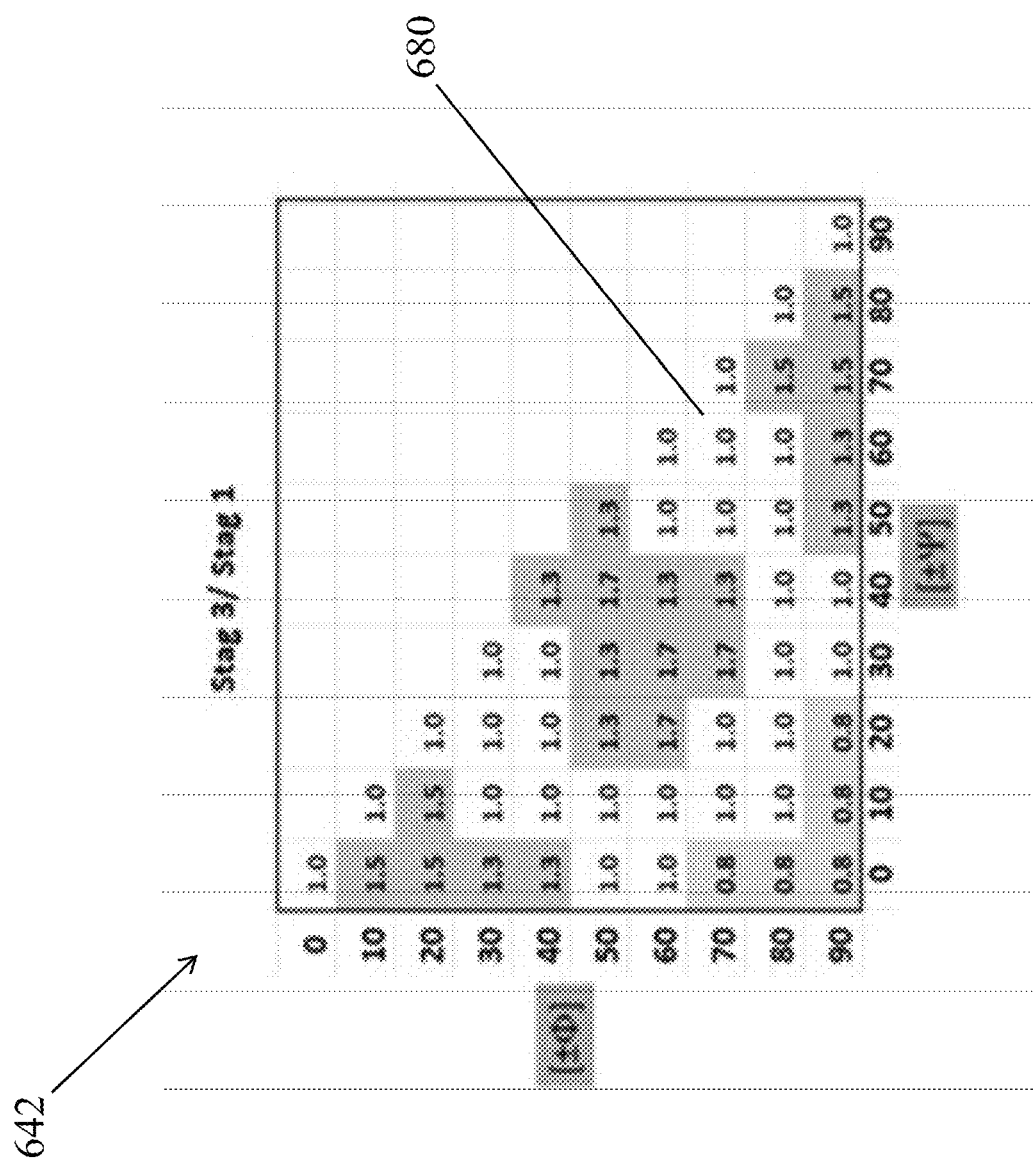
FIG. 6G shows an overlaid comparison between the first staggered configuration [Φ/−Ψ/−Φ/Ψ/] and the new third staggered configuration [Φ/−Ψ/Ψ/−Φ] according to various embodiments described herein.

The enhancement factor 680 of the first staggered configuration 603 relative to the third staggered stacking sequence 605 may be further appreciated, according to various embodiments, with reference to table 642 of FIG. 6G. In this figure, the repeat values for respective sequences or configurations under comparison are overlaid and divided relative to one another. For the sequences with angular pairs of 60/20, 60/30, 70/30, and 50/40—all have enhancement factors 680 of 1.7 or greater. Notably, beyond the central portion of table 642, angular pairs of 10/0, 20/0, 20/10, 80/70, 90/70, and 90/80 have enhancement factors 680 of 1.5 of greater. In the remaining areas, the third staggered stacking sequence 605 performs equally with the first staggered sequence 603 or configuration.

As a further observation, even where the third staggered sequence 605 performs less optimally than the first staggered sequence 603 (e.g., angular pairs of 70/0, 80/0, 90/0, 90/10, 90/20), the third staggered sequence 605 continues to achieve homogenization with a lesser number of repeats than that required via the paired stacking sequences 601/602, thus providing remaining advantages as well. Stated otherwise, the third staggered sequence 605 controls the area close to (Φ=90, Ψ=0) and the first staggered sequence 603 controls the area close to the diagonal [Φ=Ψ]. As a non-limiting example, this paired and largely non-overlapping set of advantageous angular pairings indicates useful applications for combinations of the first/third staggered sequences in laminate structures formed from more than one sub-laminate module.

Figure 6H:
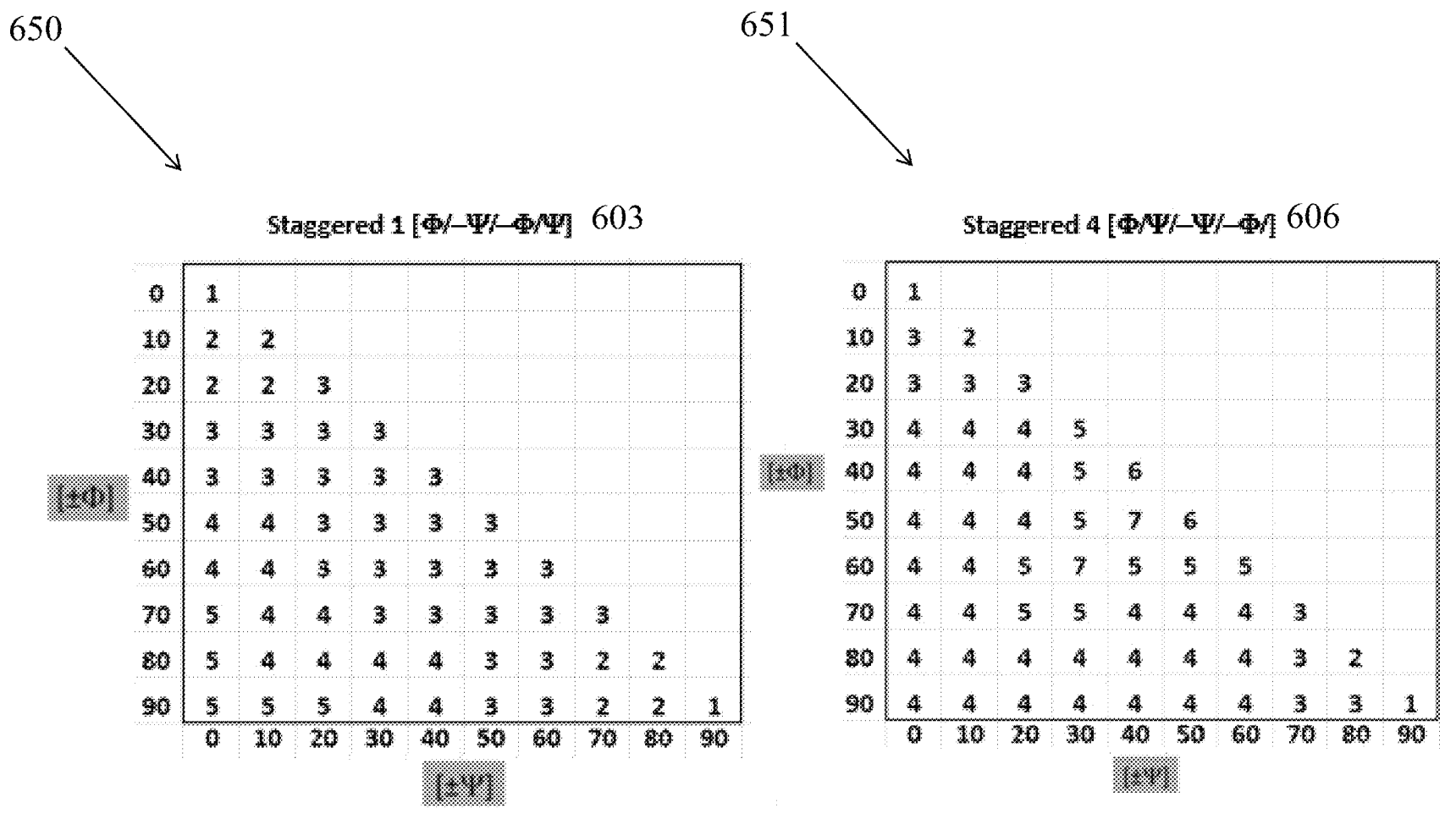

Reference is next made to FIG. 6H, illustrating a comparison between the first staggered configuration 603 [Φ/− Ψ/−Φ/Ψ/] and the fourth staggered configuration 606 [Φ/Ψ/−Ψ/−Φ] according to various embodiments. By way of comparison of table 650 and table 651, the fourth staggered stacking sequence 606 or configuration needs, in certain angular orientations, more repeats for homogenization than the first staggered stacking sequence 603. As a non-limiting example, compared to the three (3) repeats or layers required for homogenization of the first staggered stacking sequence 603 of [60/−40/−60/40], that same set of angles staggered in a sequence of [60/40/−40/−60] requires five (5) repeats or layers for homogenization. In this embodiment of the first staggered stacking sequence 603 alone, homogenization (and desirable material characteristics of laminate structures related thereto) is achieved with nearly half the ply layers and thus material/thickness/weight/and the like. Other angular pairings (e.g., 40/40 and 50/50) do achieve homogenization with half the number of layers or repeats. Of course, in certain embodiments where the fourth staggered sequence has values largely aligned with that of the first staggered sequence, for example with the sequence 606 of [80/10/−10/−80] of FIG. 6H, a repeat of four (4) remains an improvement of the same angular combination applied to either paired sequence 601/602 (see FIG. 6A) of [80/−80/10/−10], requiring eight (8) repeats.

Figure 6I:
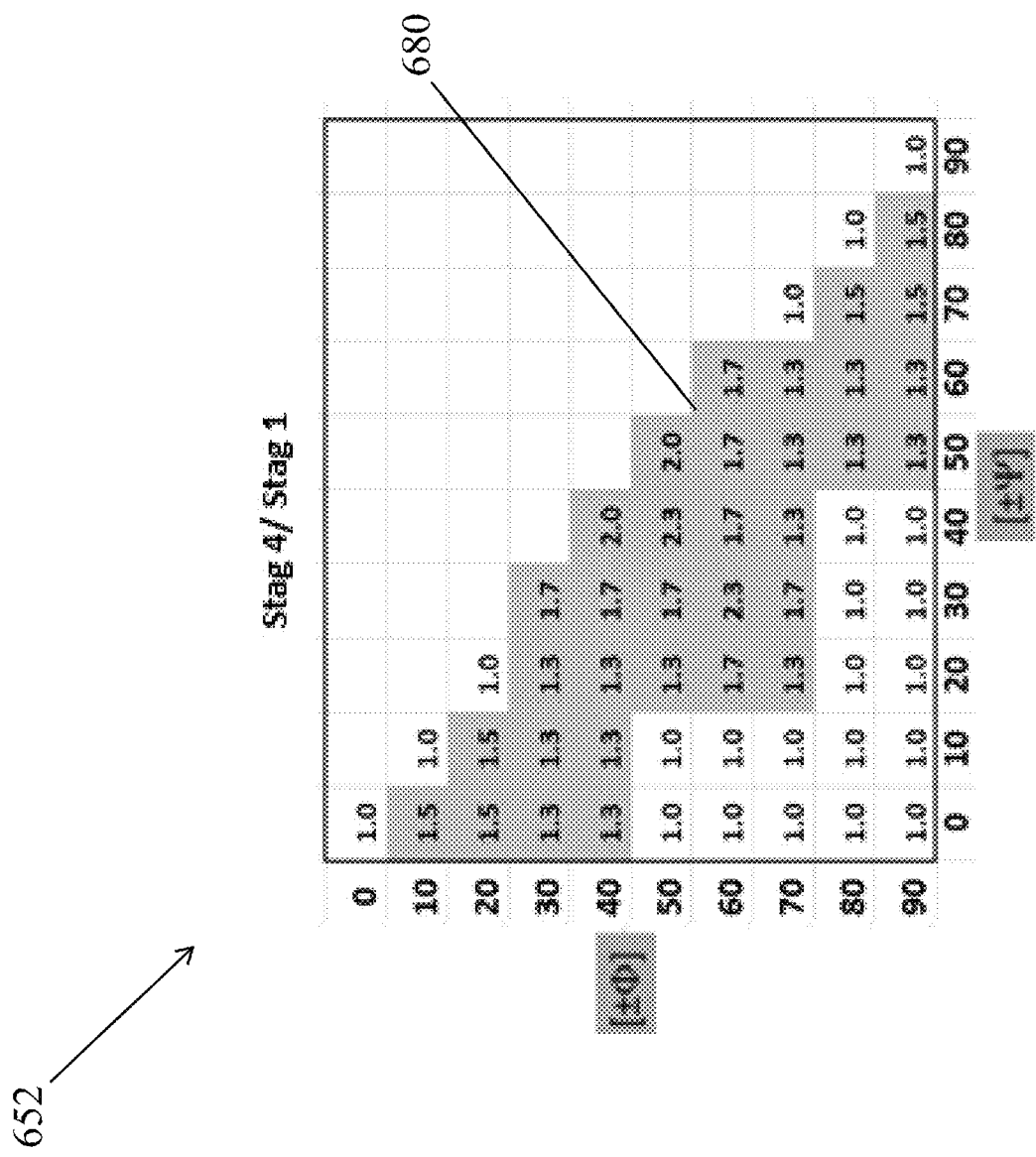
FIG. 6I shows an overlaid comparison between the first staggered configuration [Φ/−Ψ/−Φ/Ψ/] and the new fourth staggered configuration [Φ/Ψ/−Ψ/−Φ] according to various embodiments described herein.

The enhancement factor 680 of the first staggered configuration 603 relative to the fourth staggered stacking sequence 606 may be further appreciated, according to various embodiments, with reference to table 652 of FIG. 6I. In this figure, the repeat values for respective sequences or configurations under comparison are overlaid and divided relative to one another. For the sequences having angular pairs of 40/40, 50/40, 50/50, and 60/30—all have enhancement factors 680 of 2.0 or greater. Notably, beyond the central portion of table 652, the lower-left quadrant of angular pairs has enhancement factors 680 of 1.0, indicating comparable performance and homogenization as the first staggered sequence 603. As a further observation, even where the fourth staggered sequence 606 performs comparable with the first staggered stacking sequence 603, both continue to achieve homogenization with a lesser number of repeats than that required via the paired stacking sequences 601/602, thus providing remaining advantages as well.

Figure 7:
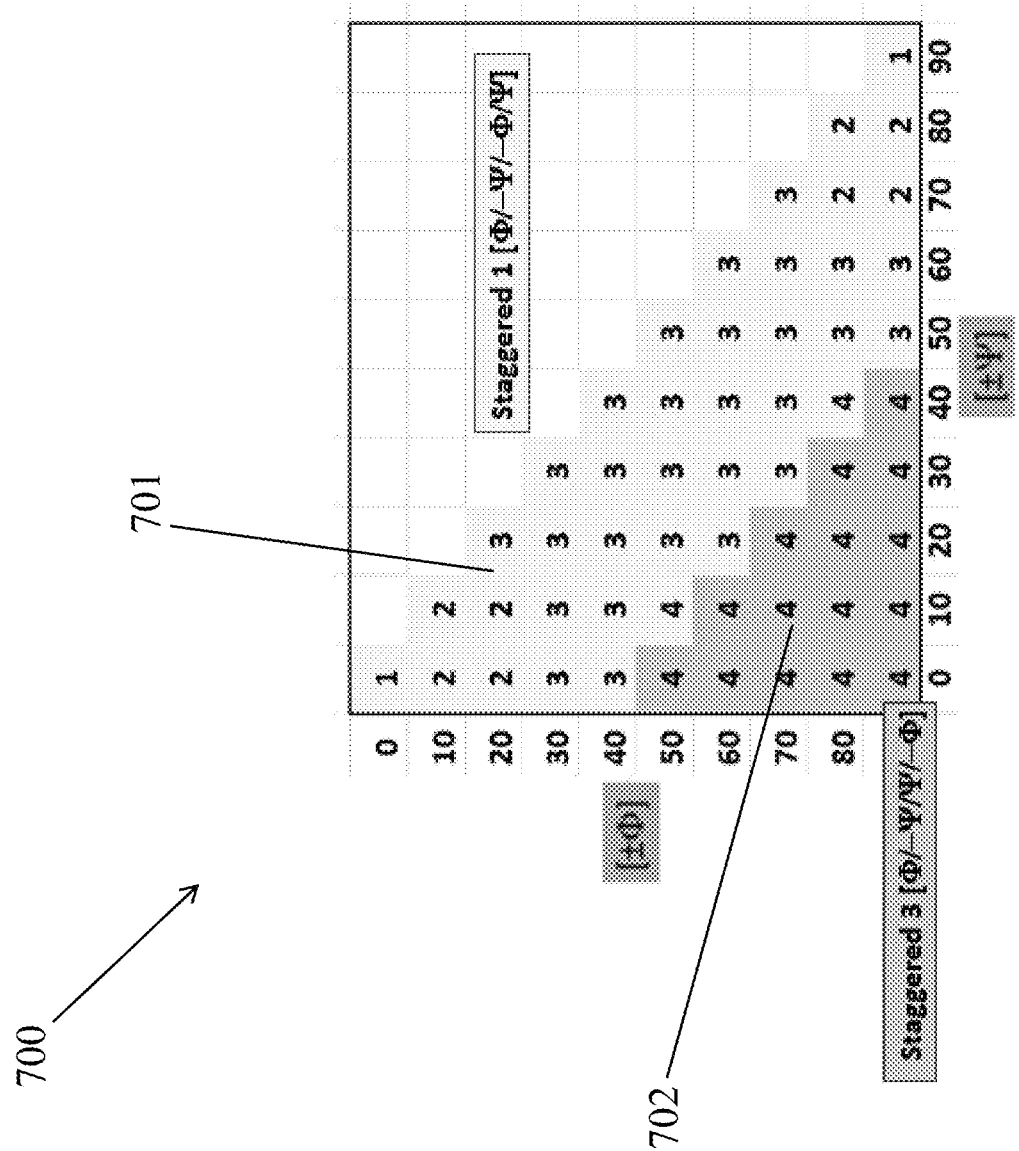
FIG. 7 shows a combination of the first staggered configuration [Φ/−Ψ/−Φ/Ψ/] and the third staggered configuration [Φ/−Ψ/Ψ/−Φ] for optimizing repeats for homogenization across an angular spectrum according to various embodiments described herein.

Turning now to FIG. 7, shown is a further comparison of the first staggered configuration [Φ/−Ψ/−Φ/Ψ/] and the third staggered configuration [Φ/−Ψ/Ψ/−Φ], illustrating a combination thereof for optimizing repeats for homogenization across an angular spectrum according to various embodiments. In other words, FIG. 7 illustrates, by way of non-limiting example, a configuration across all angular pairs, combining both the first and third staggered sequences 602/605 in different areas of table 700, so as to minimize the number of repeats across the entire field. As evident from FIG. 7, the first staggered configuration [Φ/−Ψ/−Φ/Ψ/]

require fewer repeats (i.e., ply layers) for double-double homogenization where a first absolute difference 701 between |Φ−Ψ| is less than 45 degrees. By way of comparison, the third staggered configuration [Φ/−Ψ/Ψ/−Φ] requires fewer repeats (i.e., ply layers) for double-double homogenization where a second absolute difference 702 between |Φ−Ψ| is greater than 45 degrees. As a result, for a laminate or sub-laminate structure having a variety of ply orientations (i.e., with both [Φ−Ψ] greater than and less than 45 degrees), a combination of staggered stacking sequences or configurations may be utilized within a single structure.

Remaining with FIG. 7, considering the lower repeat of the two fields (i.e., the first staggered and the third staggered configurations) it may be understood that a sharp demarcation line exists at [π/4] (i.e., 45 degrees) of the absolute difference between |Φ−Ψ|. Those values where the first staggered sequence 603 is optimal are shaded more lightly (e.g., tan) as compared to those values where the third staggered sequence 605 is optimal. Starting from the tan or yellow area, a distinct example of the first staggered sequence $[45/-45/-45/45]_{rT}$ is symmetric, which reveals why this area is optimal for the first staggered sequence as compared to the third. Similarly in the aqua or darker shaded area, the third staggered sequence of $[0/90/90/0]_{rT}$ is symmetric, indicating the basis for this area being optimal and controlled by the third staggered sequence as compared to the first. In these examples, where double-double laminates are constructed, if thin plies are utilized (0.0625 mm in thickness), the highest thickness at For DD with thin plies (0.0625 mm), the highest thickness at eight (8) repeats would be 0.3125 mm for 2 percent. By comparison, a conventional legacy laminate would take 72 regular plies or 9 mm to reach homogenization; 18 times thicker.

Figures 9A, 9B:
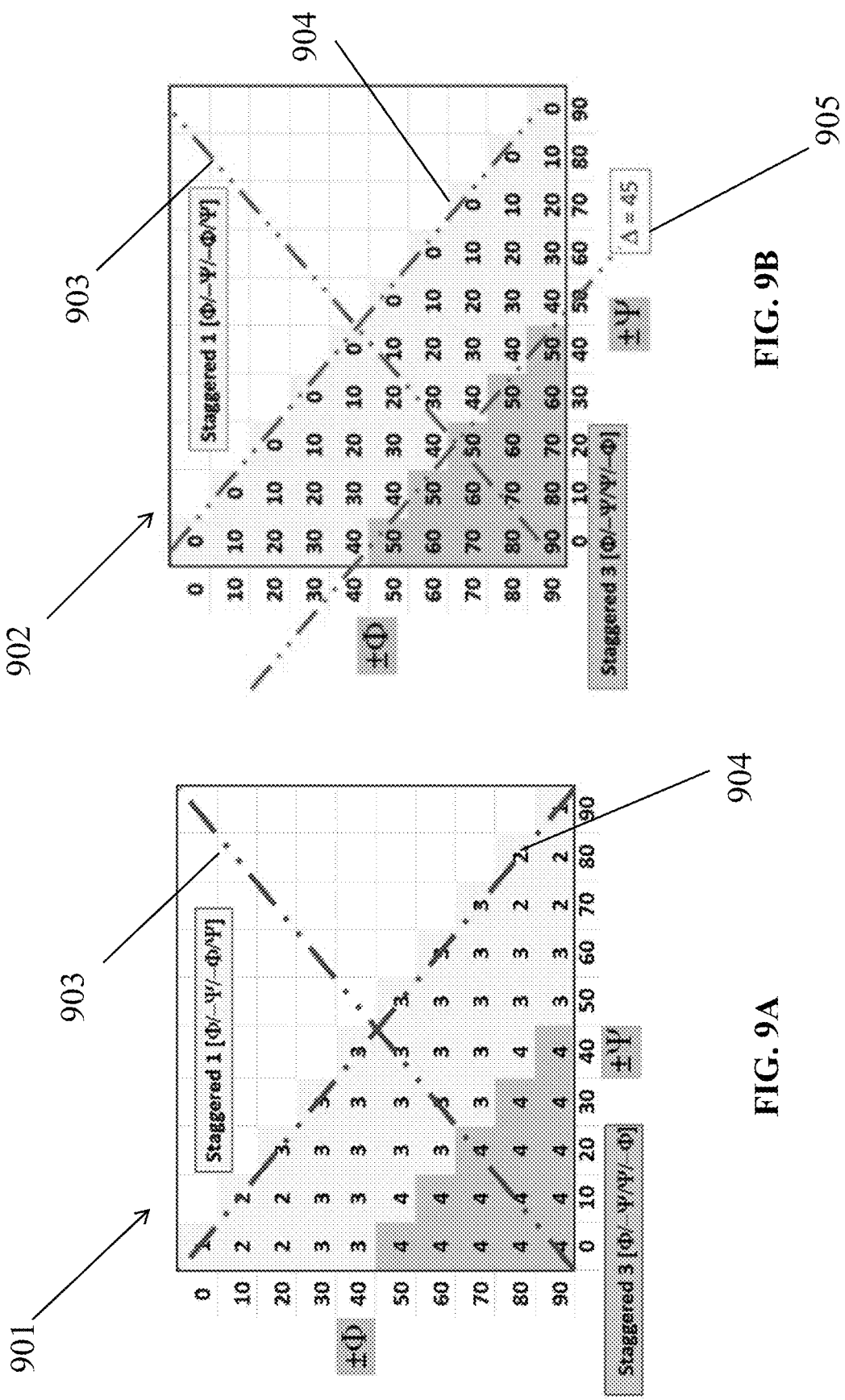
FIGS. 9A-B show exemplary number of repeats to reach homogenization and an absolute difference between [Φ−Ψ] for the first and third staggered configurations according to various embodiments described herein.

Skipping next to FIGS. 9A-B, shown therein in tables 901/902, respectively, are exemplary number of repeats to reach homogenization relative to an absolute difference between [Φ−Ψ] for the first and third staggered configurations (see also FIG. 7) according to various embodiments described herein. As mentioned previously herein, certain laminates or sub-laminate structures may be constructed using a combination of the staggered stacking sequences 603-606, depending on desired material characteristics, homogenization, and the like. Consider as examples a construction wherein the layers have the same stacking except for the outer two sets of ply layers. So constructed, the convergence rate of the five sequences (toward homogenization) varies, with the first staggered sequence 603 and the third staggered sequence 605 (those extensively described herein) being the fastest to converge due to their being the most disperse, as compared to the second and fourth staggered sequences 604/606.

This may be understood with reference firstly to FIGS. 9A-B. In FIG. 9A, symmetry lines 903/904 indicate the symmetry that exists with respect to the axes [Φ=Ψ] and [Φ+Ψ=90], respectively. Along line 904, for example, the five angular options (90/0; 80/10; 70/20; 60/30; 50/40) converge to the same [ABBD]* with [B]*=0 and [A]*=[D]*, as defined previously herein. The only difference is the convergence rate, whereby, as a non-limiting example, the angular orientation 50/40 converges to homogenization with three (3) repeats or layers, as compared to the four (4) repeats required at 90/0. A key factor is, as also previously detailed herein, the absolute difference between |Φ−Ψ|, whereby the [π/4] (i.e., 45 degrees) demarcation line 905 of the absolute difference is defined, as evident in FIG. 9B.

Figure 9C:
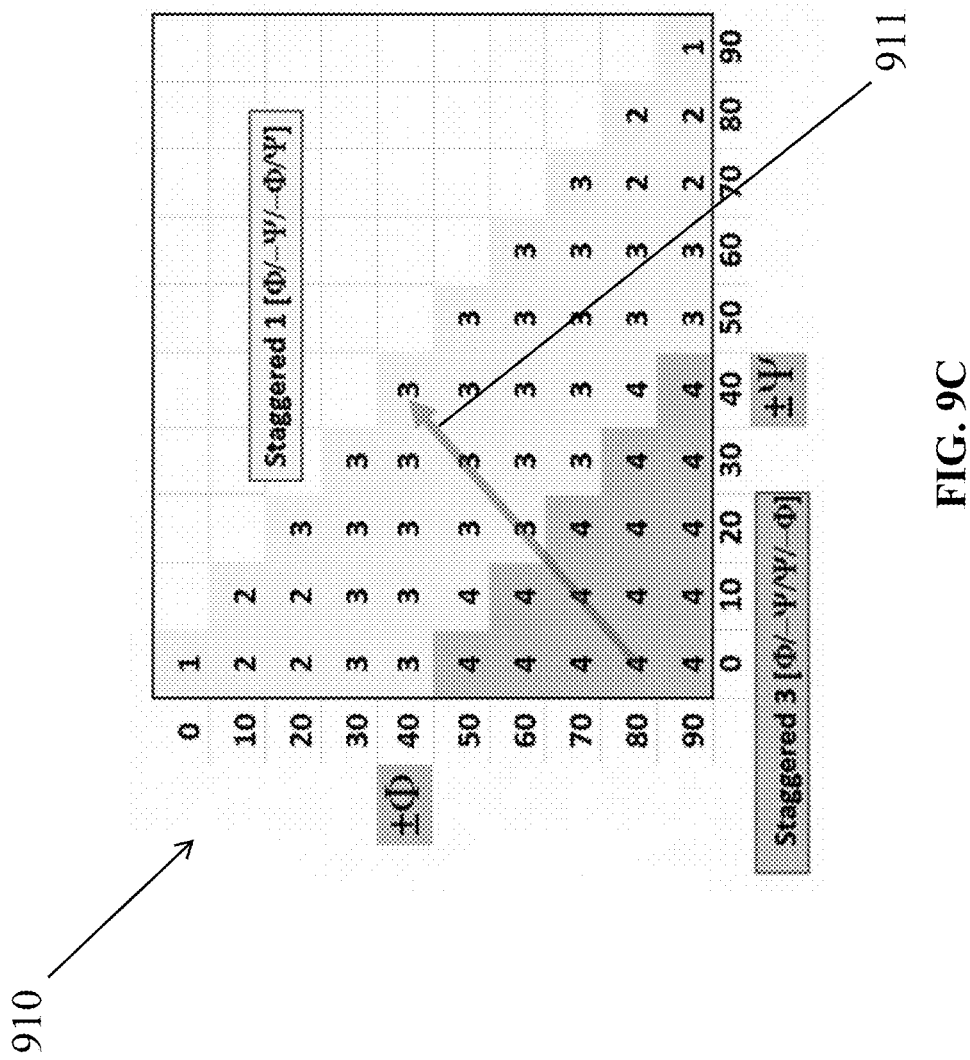
FIG. 9C shows a mapped set of five distinct sequences utilizing the first and third staggered configurations, for determination of a converge rate thereof according to various embodiments described herein.

Turning to FIG. 9C, mapped therein in table 910 is another exemplary set of five distinct sequences, utilizing the first and third staggered configurations 603/605, for determination of a convergence rate 911 thereof according to various embodiments described herein. In conjunction with following FIGS. 10A-E, the results are understood for the following distinct angular differences:

[Φ=80;Ψ=0];[Φ=70;Ψ=10];[Φ=60;Ψ=20];[Φ=50; Ψ=30];[Φ=40;Ψ=40]

To determine the convergence rate 911, the variation with respect to [A*=D*] and [B*=0] is defined as:

Maximum value of $$\begin{cases} \text{Maximum value of } |B_{ij}^*|/A_{11}^* \text{ for } i=1,2,3, j=1,2,3 \\ \text{Maximum value of } |B_{ij}^*|/D_{11}^* \text{ for } i=1,2,3, j=1,2,3 \\ \text{Maximum value of } |A_{ij}^* - D_{ij}^*|/A_{11}^* \text{ for } i=1,2,3, j=1,2,3 \\ \text{Maximum value of } |A_{ij}^* - D_{ij}^*|/D_{11}^* \text{ for } i=1,2,3, j=1,2,3 \end{cases}$$

Figure 10A:
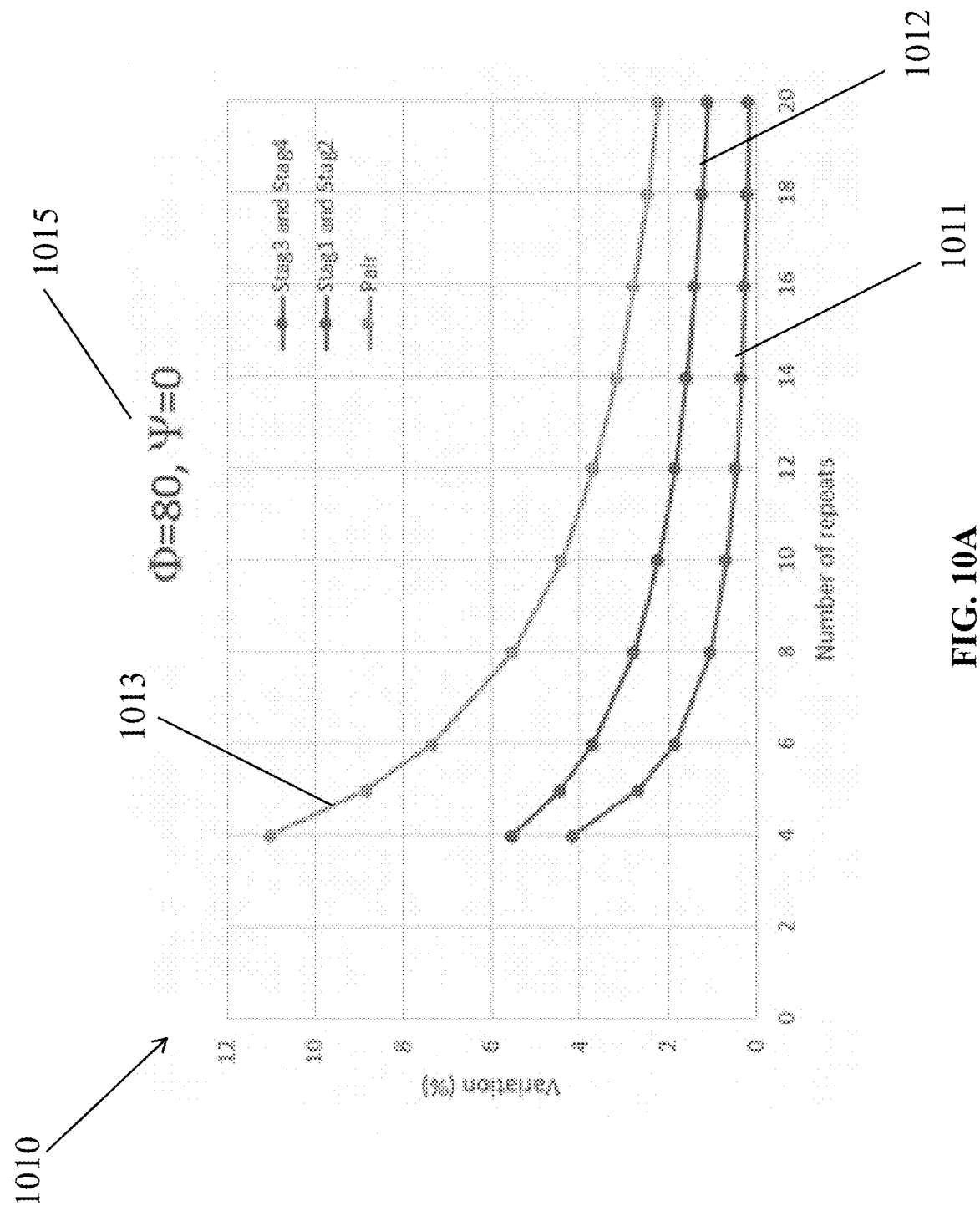
FIGS. 10A-E show convergence rate results for various discrete iterations of the first and third staggered configurations, further compared to the paired and second and fourth staggered configurations according to various embodiments described herein.

Referencing first FIG. 10A and the chart 1010 illustrated therein, it may be seen and understood that, as defined, the third and fourth staggered stacking sequences or configurations 605/606, respectively, provide the fastest convergence rates along plot line 1011. This is at least because the angular difference 1015 for [Φ=80; Ψ=0] is very close to [Φ=90; Ψ=0], where the third/fourth sequences are symmetric [0/90/90/0]$_{rT}$. The first and second staggered sequences or configurations 603/604 are not symmetric at [Φ=90; Ψ=0], thus providing a slower convergence with plot line 1012. The paired stacking sequences or configurations 601/602 have still further repeats and a slower convergence with plot line 1013. It may thus be understood that for [Φ=90; Ψ=0], convergence is quicker (i.e., with fewer repeats) for the third and fourth staggered sequences, although all of the described staggered sequences outperform and/or are optimal as compared to the paired stacking sequences or configurations.

Figure 10B:
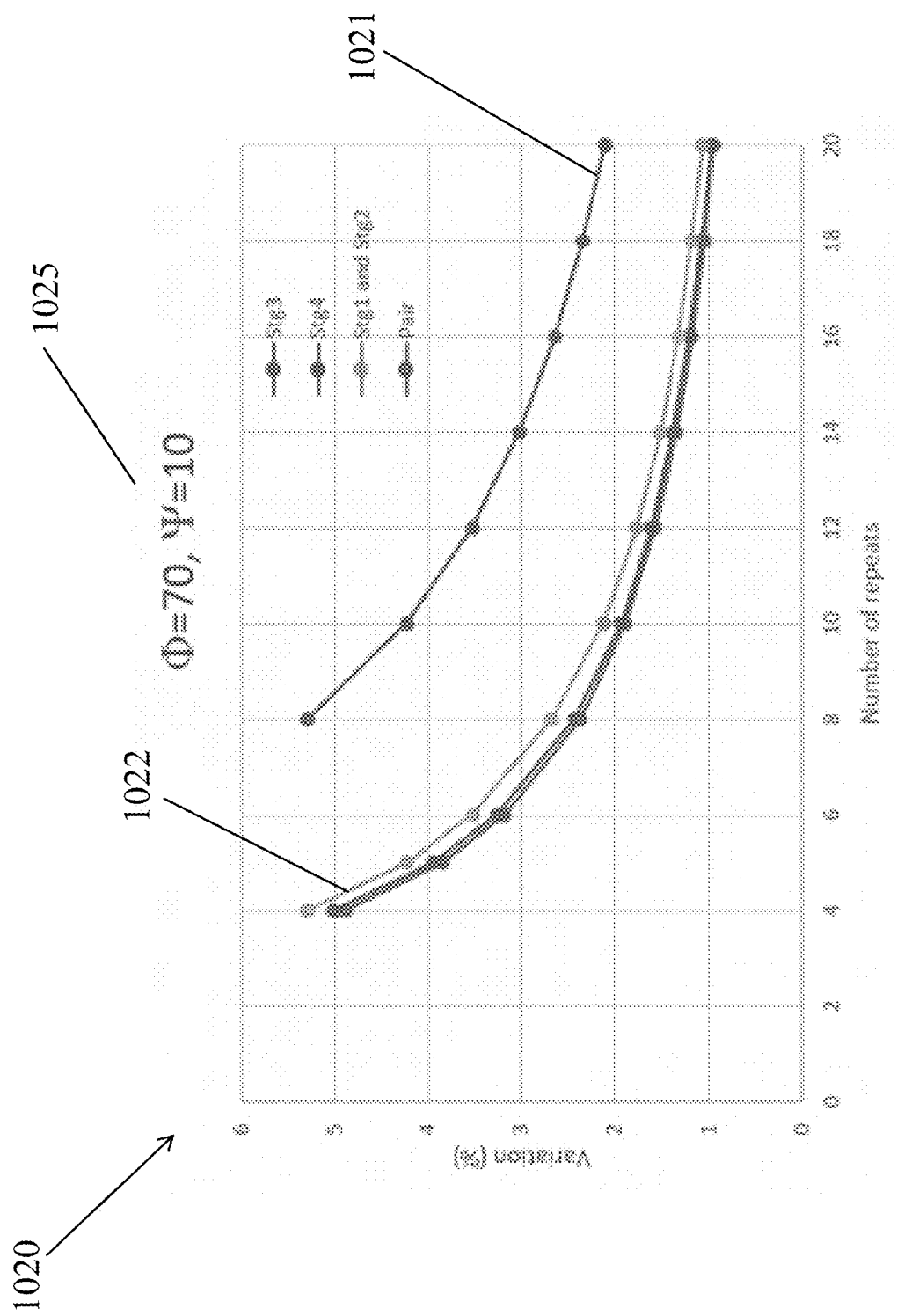

Turning to FIG. 10B, chart 1020 illustrates the [Φ=70; Ψ=10] angular difference configuration 1025. In this configuration the third staggered sequence 605 slightly outperforms even the fourth staggered sequence 606. Still further, the first and second staggered sequences 603/604 are very near (but not quite equal to) the performance of the third and fourth sequences or configurations. This is at least because the [Φ=70; Ψ=10] angular difference is not that close to the 90/0 configuration. Performance again is not comparable to that achievable with a paired stacking sequence 601/602 (see plot line 1021). For example, more than double the percentage variation remains in a paired stacking sequence, even with 20 repeats or ply layers (compare plot line 1021 with those grouped as lines 1022).

Figure 10C:
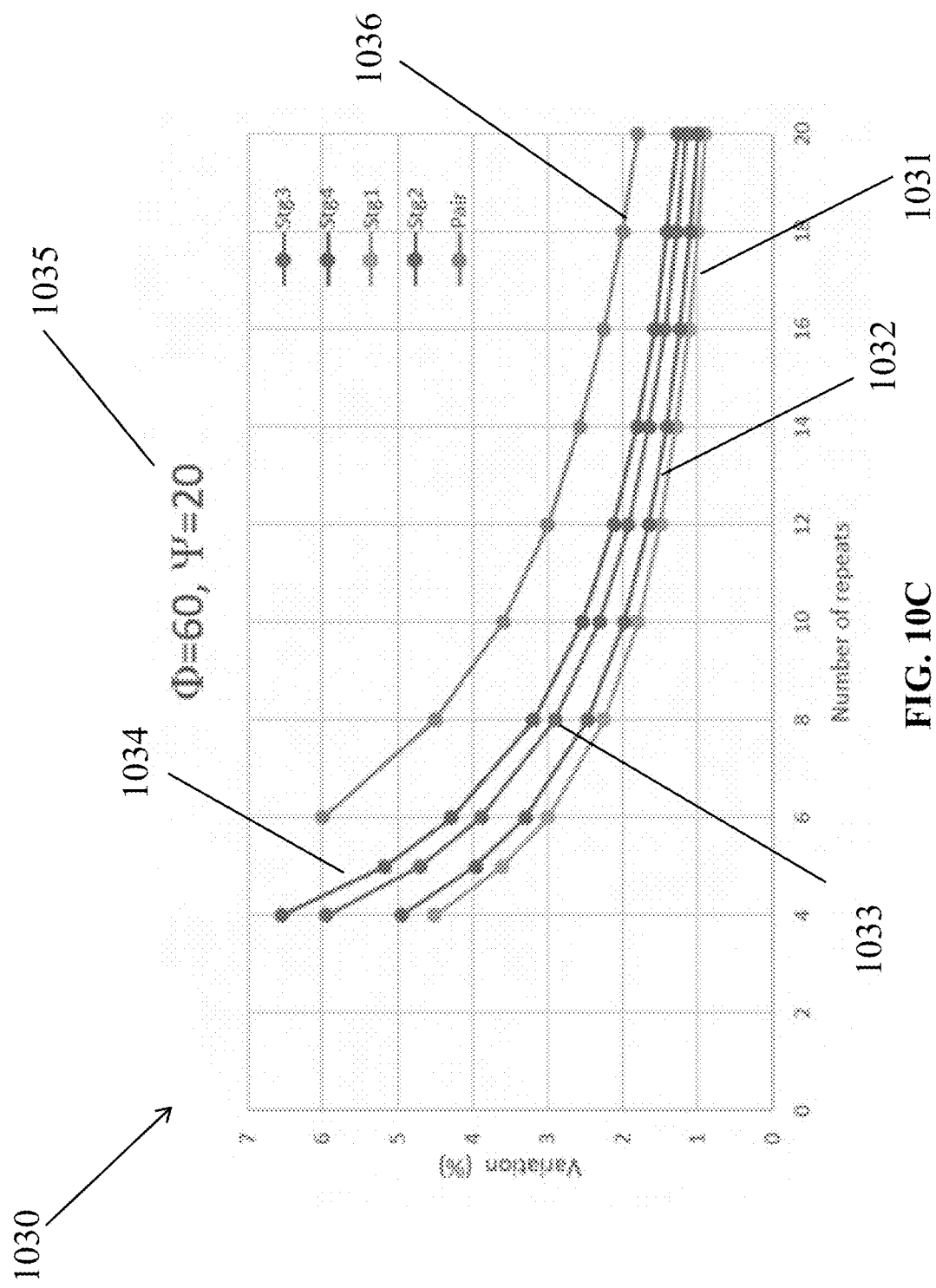

In FIG. 10C, the [Φ=60; Ψ=20] angular difference 1035 is illustrated in chart 1030, whereby all four of the staggered stacking sequences 603-606 perform slightly differently, largely due to the departure from the [Φ=90; Ψ=00] angular difference, where symmetry exists. More importantly, as we transition across the [π/4] (i.e., 45 degrees) demarcation line 905 (see FIG. 9B), the first staggered sequence 603 (line 1031) presents the fastest convergence rate, followed by the second staggered sequence 604 (line 1032), the third staggered sequence 605 (line 1033), and the fourth staggered sequence 606 (line 1034). Once again, all staggered sequences or configurations 603-606 outperform the paired stacking configurations 601-602 (line 1036).

Figure 10D:
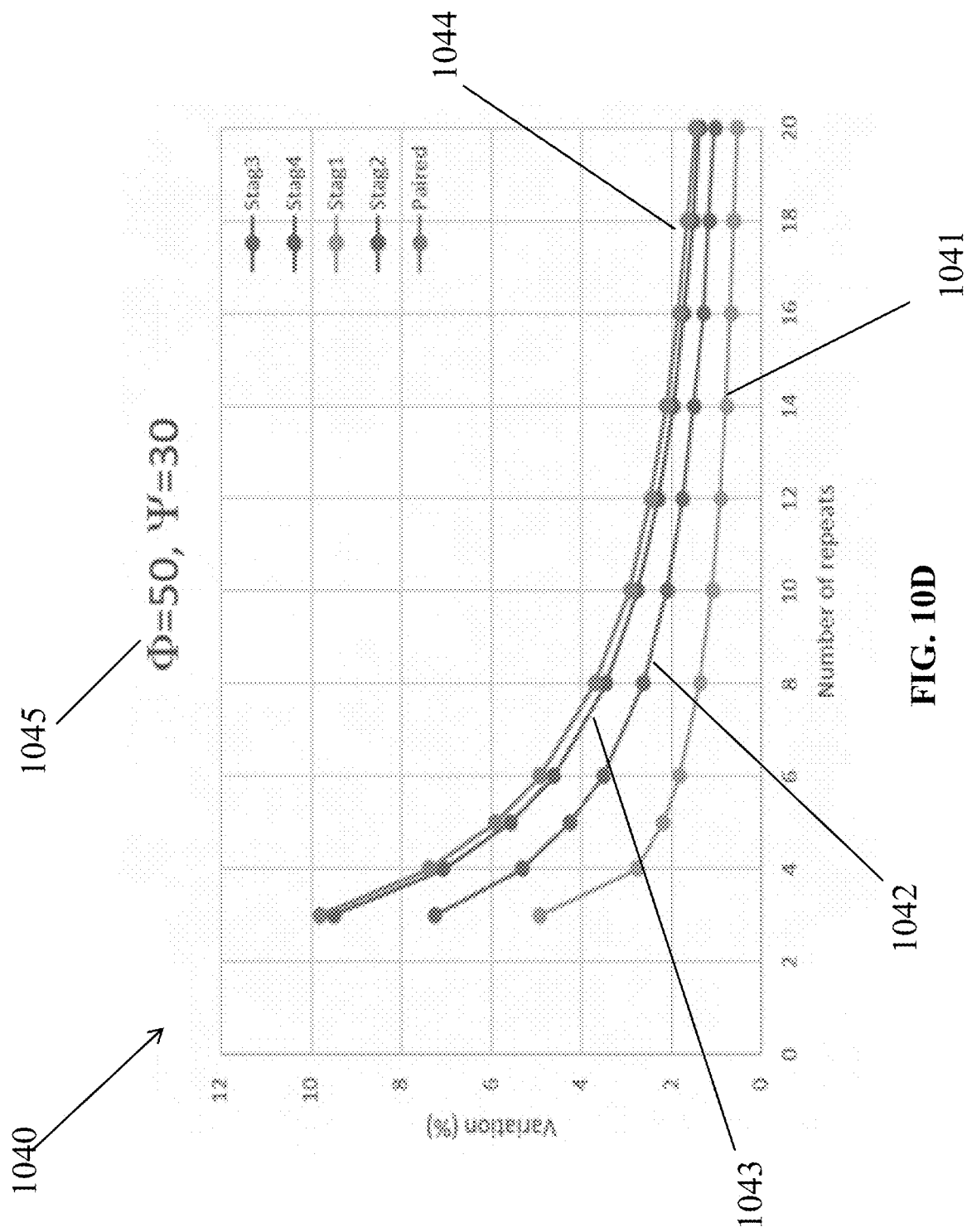

Progressing further beyond the [π/4] (i.e., 45 degrees) demarcation line 905 (see FIG. 9B), the [Φ=50; Ψ=30] angular difference 1045 is illustrated in chart 1040 of FIG. 10D, whereby the first staggered sequence 603 is further optimized (line 1041), as compared to the convergence rate observed for the third staggered sequence 605 (line 1042)—both trailed further by second and fourth and paired sequences or configurations (line 1043). With movement further from the [Φ=90; Ψ=00] angular difference, where symmetry exists, the second and fourth sequences fail to perform significantly better than the paired configuration or sequence (line 1044).

Figure 10E:
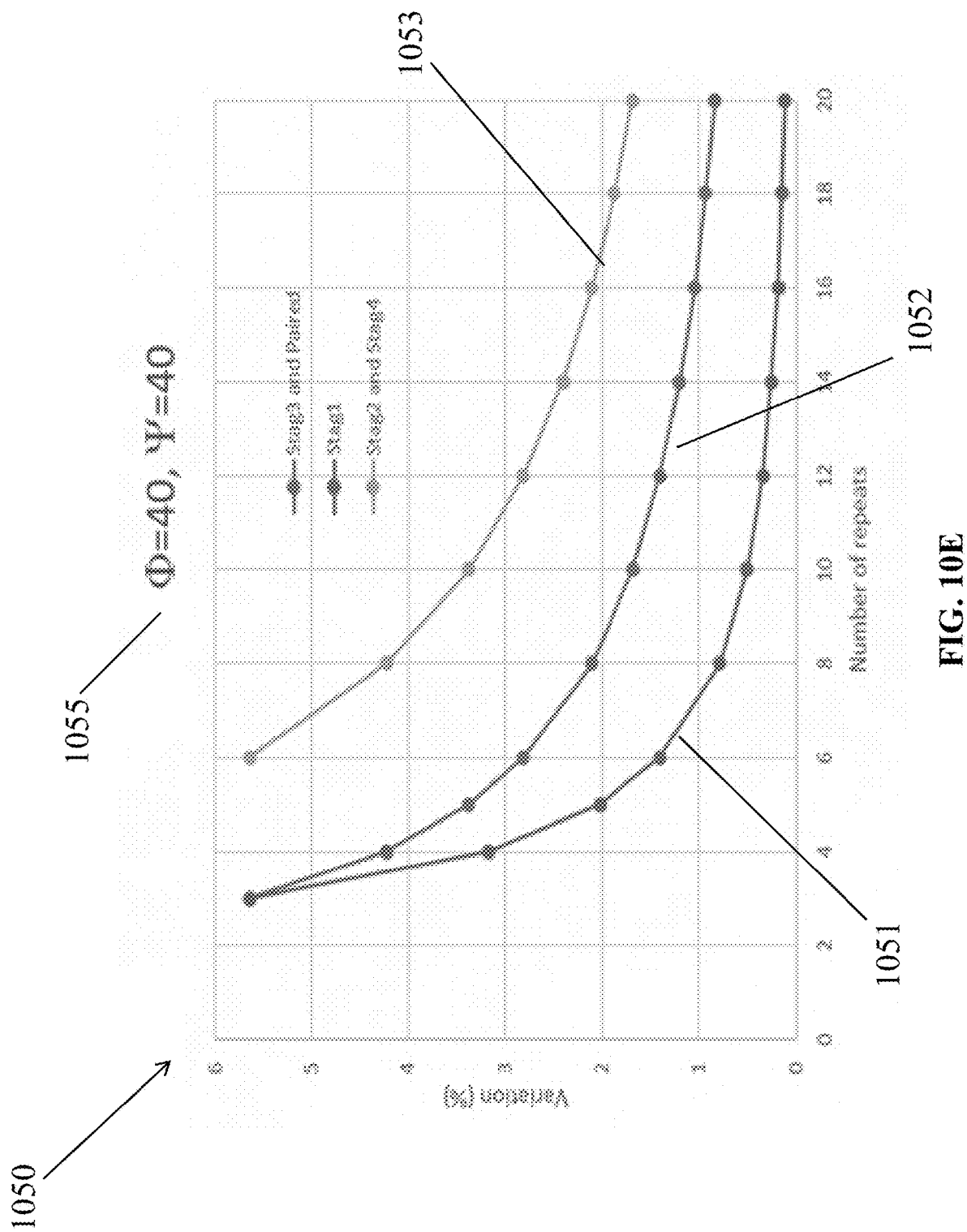

This may be seen even more evidently in FIG. 10E for the [Φ=40; Ψ=40] angular difference 1055 and chart 1050 thereof, whereby the first staggered sequence 605 (line 1051) converges below 1% variation with as few as eight (8) repeats or layers. By way of comparison, the third staggered sequence 605 and the paired sequences 601/602 converge (line 1052) to the same degree only after 18 repeats or layers; more than twice. Even at 20 repeats or layers, the convergence and variation percentage for the second and fourth staggered sequences 604/606 remain near 2% (line 1053). The first staggered sequence 603 shows the fastest convergence rate at least because the [Φ=40; Ψ=40] angular difference is very close to sequence $[45/-45/-45/45]_{rT}$ which is symmetric (see again FIG. 9B).

Comparing and considering FIGS. 10A-E collectively, it may be understood that the staggered sequences requiring the fewest repeats (i.e., layers) to reach homogenization are those whose couples are composed of different angles and different signs, as illustrated below:

Staggered 1  [Φ/−Ψ/−Φ/Ψ]   and   Staggered 3  [Φ/−Ψ/Ψ/−Φ].
Different angles and different          Different angles and different
signs (plus and minus)                  signs (plus and minus)

Considering the above, it also follows that the sequence requiring the fewest repeats, across multiple angular differences is a combination of the two sequences illustrated above, namely the first and third staggered sequences or configurations 603/605, respectively. Of particular preference, the first staggered sequence is optimal where the absolute difference in angles is less than 45 degrees, coupled with utilization of the third staggered sequence where the absolute difference in angles is greater than 45 degrees, as detailed elsewhere herein. These staggered sequences (the "staggered" term to be contrasted with a pairing of equal/opposite angles in any coupling) are thus favorable and/or desirable for achieving homogenization with the fewest number of repeats or ply layers for a laminate or sub-laminate structure.

Exemplary Non-Limiting Applications and Methods of Stacking

Various embodiments utilizing the staggered stacking sequences 603-606 described herein may be utilized in manufacturing and/or otherwise forming multi-ply layer laminate structures and/or one or more sub-laminate modules and structures having multi-ply layers, whereby one or more of the distinct modules may operate as a building block, with two or more thereof being combined to define any distinct laminate structure. Exemplary types of structures include: cylinders, fuselages, wings, pressure vessels, wind turbine components, rockets, and the like. Structures may be grid, skin-based, a combination of grid/skin as detailed in PCT/US2018/025600 (as published), with tapering techniques described therein also applicable.

Lay-up methods and techniques may also be understood from PCT/US2018/025600 and related publications by the named inventor(s), whereby the layup of tape or fabric (or even grid/skin combinations) can go from one end of a structure to the opposite end without stopping, cutting, or experience local tape buckling. Conventional legacy quad sub-laminates simply cannot achieve such smooth paths, due at least in part to the internal constraints placed thereon, including maintaining of certain plies at particular angles throughout. Flexibility and simplicity, with improved convergency upon homogenization with fewer repeats (i.e., layers) is achieved only via the staggered stacking sequences and configurations detailed herein, when utilized alone or in combination with paired sequences also applicable to double-double laminate structures.

Figure 8A:
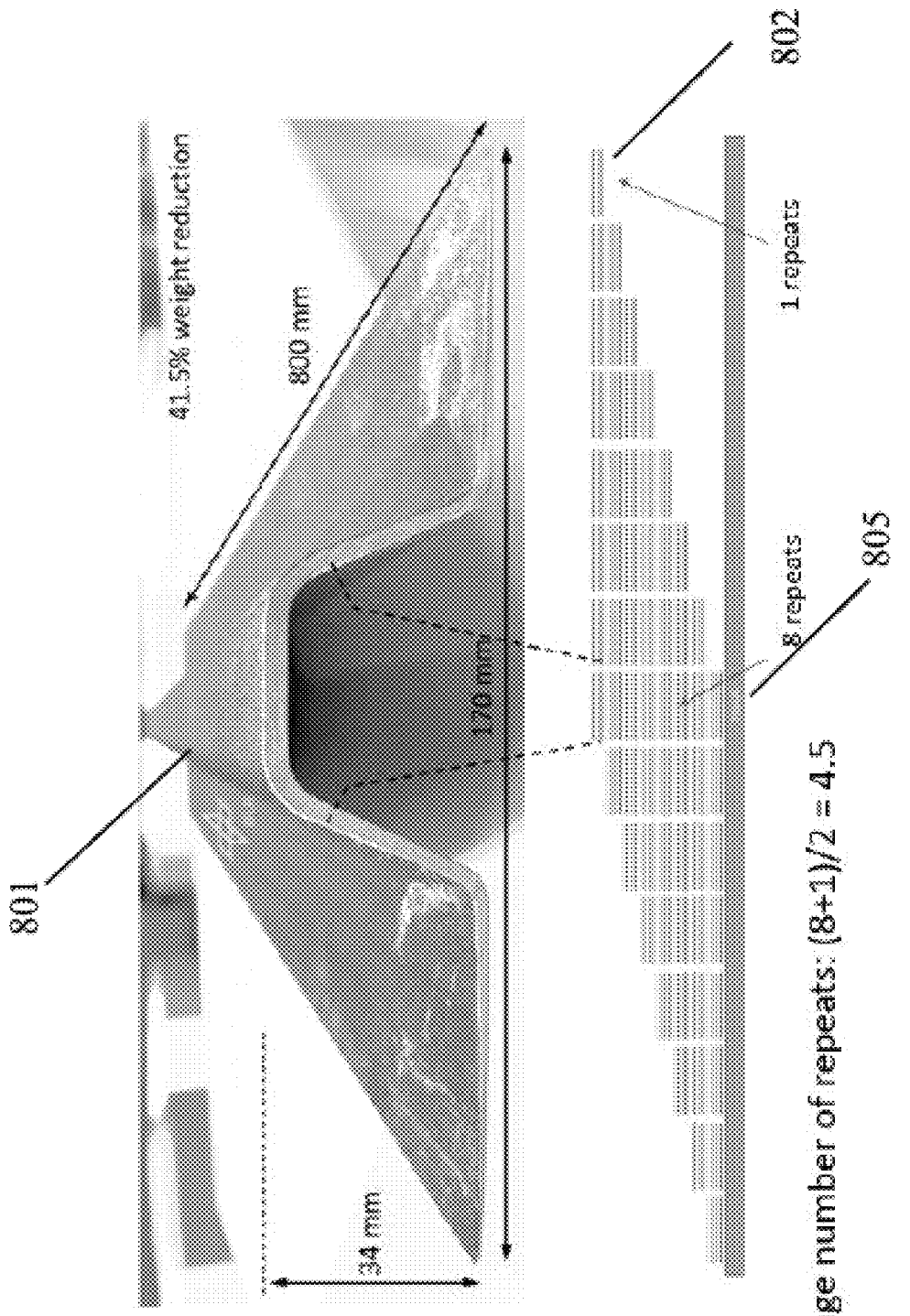
FIGS. 8A-B show an exemplary part with application thereto a tapered laminate structure using different staggered configurations according to various embodiments described herein.
Figure 8B:
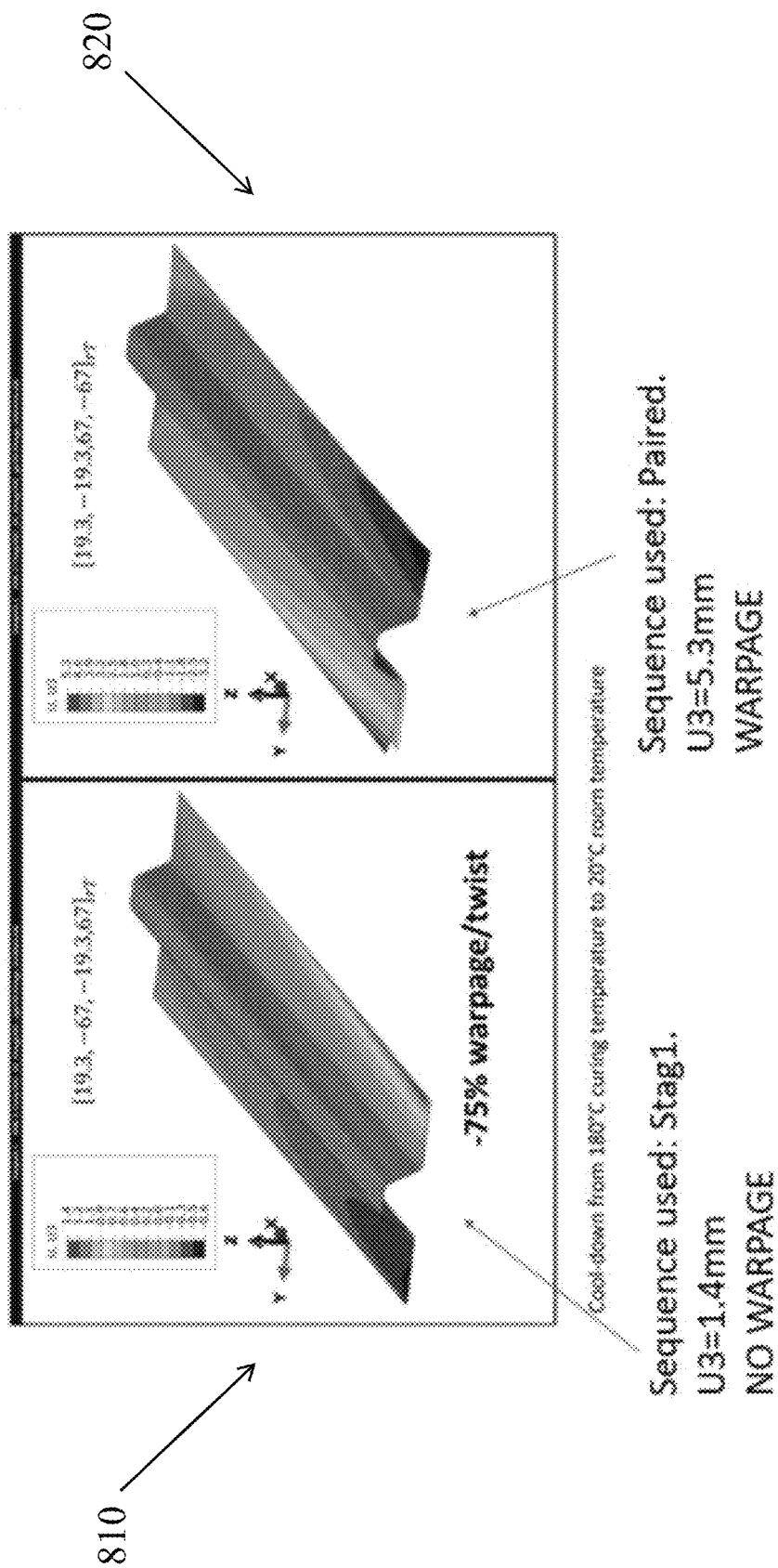

An exemplary part 801 is illustrated with reference to FIGS. 8A-B, with a tapered and staggered configuration applied thereto according to various embodiments. As shown, the omega part 801 may realize an over 40% weight reduction by using the double-double configurations described herein. With a maximum thickness 805 at eight (8) repeats and tapered applied to opposing and either sides thereof, down to a single (1) repeat 802 at outer edges of the part, a streamlined, light-weight part can be provided while retaining certain desirable material characteristics. For example, using the first staggered sequence 603 or configuration and a maximum thickness of 1.4 millimeters (for homogenization), no warpage is observed under testing, as illustrated in imaging 810, left side of FIG. 8B. This can be contrasted with imaging 820 on the right side of FIG. 8B, whereby a much thicker part is required that nevertheless exhibits some degree of warpage under testing. Thus, beyond reduced thickness capabilities, the convergence upon homogenization realizes additional advantages and material characteristic benefits, even as compared to the paired stacking sequence configurations 601/602.

Figure 8C:
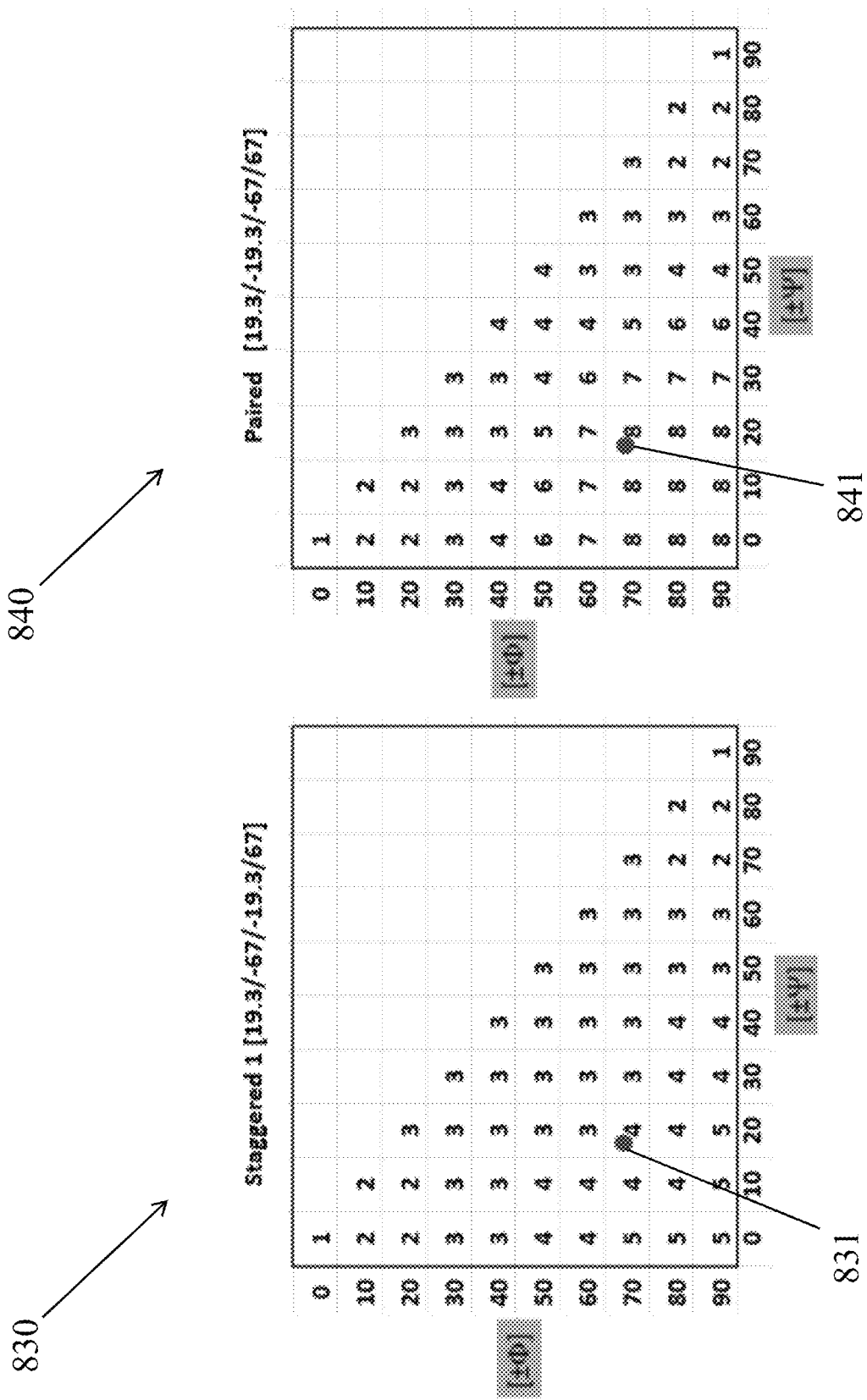
FIG. 8C shows a comparison of results with the first staggered configuration [Φ/−Ψ/−Φ/Ψ/] applied to the exemplary part, versus the paired configuration.

Considering also FIG. 8C, when the first staggered sequence 603 was used in a 70/20 angular difference configuration 831 (see chart 830), the part showed minimal (if any) noticeable twist or warpage, even when the average number of repeats was reduced to 4.5; and a minimum of four (4) repeats or ply layers. This may be contrasted once more with the paired sequence 602 used with the same 70/20 angular difference 841 configuration (see chart 840). In the latter, the part 801 showed visible twist deformation, even when the same (4.5) average number of repeats were used. This is, at least in part, due to the required minimum number of 8 repeats for homogenization utilizing the paired configurations. Homogenization is thus another practical way to limit, minimize, and/or eliminate warpage with high repeats. In certain embodiments, for example within the first staggered sequence 603, a bending-torsion coupling is also achieved, improving the structural integrity of parts such as that illustrated with even as few as four (4) repeats or ply layers.

Turning to FIG. 11, a particular test case is illustrated, namely the single-double (Φ=Ψ) configuration 1100. In this embodiment, a paired stacking sequence (see configurations 601/602 described elsewhere herein) maintains single-thickness plies while a first staggered sequence 603 is provided with plies having a double thickness, which is an advantage for paired stacking sequence. Because the first staggered sequence 603 or configuration is symmetric and therefore after cure there will be no warping, this unique sequence exhibits the bending-torsion coupling mentioned herein-above. This may be distinctly contrasted with a paired sequence, which will typically generate some warping after cure, due at least in part to the in plane-bending coupling and no bending-torsion coupling achieved thereby.

As a result, it is observed that the first staggered sequence 603 is preference for tapered structures (e.g., part 801); this, amongst various advantages can suppress undesirable warping at part edges and/or any delamination associated therewith. For additional or alternative parts (not illustrated specifically) that may be subjected to in-plane loads, since no bending will be generated, the first staggered sequence 603 is also considered optimal. By way of contrast, though, so as to not minimize the remaining usefulness thereof, the paired sequences 601/602 and/or configurations thereof are advantageous in closed parts with no free edges, including for structures such as cylinders—where bending but not torsion may be encountered and/or externally applied. By maintaining single-thickness plies for paired sequence stacking in such applications, thickness while maintaining homogenization can be mitigated.

To reiterate, homogenization is very important to composite laminates in general, and for double-double laminate configurations particularly. In general, when a laminate is homogenized by having many repeats, tapering can be used to reduce weight, say, from 10, to 9, to 8, to 7, and the like. If the laminate or sub-laminate structure is not homogenized, tapering can still be done to reduce weight, but the laminate properties will change as plies are dropped. It is no longer a simple way to achieve an optimum laminate with constantly varying thickness and properties. Indeed, for many complex technological applications, uncertainty and/or variation of material properties is undesirable and/or unsafe.

Exemplary Advantages Realized

Exemplary and non-limiting advantages of various embodiments of the staggered stacking sequences described herein thus include, as mere non-limiting examples, at least the following:

(1) Homogenization across the thickness of the laminate is more easily achieved with thinner sub-laminates and higher number of repeats. Legacy quad is the worst family when it comes to homogenization because its member laminates are stacks of discrete plies with 0, ±45, and 90.

(2) When a laminate is homogenized, it is naturally symmetric. Mid-plane symmetry no longer needs be enforced. This means that layup process is more error free and can be done faster. We refer to this as continuous or nonstop stacking. It reduces cost of stacking either in terms of time required to complete a layup process thus freeing ATL for other components or increase production rate with the same machine.

(3) A homogenized laminate is easier to analyze and design. The in- and out-of-plane properties are easier to determine and use for simulation. Laminate is stronger and has higher resistance to delamination. It is stronger because each thin ply failure is a smaller percentage of the total. It is tougher because interlaminar stresses are uniform across the thickness and is smaller in magnitude because of thin plies. There is no longer any stacking sequence effect.

(4) Ply drop can be done one at a time, without need to drop two with mid-plane symmetry. Ply drop can be done by sub-laminates if they are thin. Then, material property will not change as ply drop takes place. This is not so with the legacy quad laminates because as individual plies are dropped, the property of the laminate changes.

(5) With homogenized laminates like members from the double-double family layup fabrication is easier, and the tapering of laminated skin can more easily match what optimum design calls for. Thus, the structure can be expected to perform accordingly.

(6) Patches for hard points and repair can use the same sub-laminate and would be most effective because there are no stress raisers due to mismatch of stiffness.

(7) Tapering of laminates can reduce weight and put materials where it is needed. Composites are unique because it is the original additive process. Thin-ply sub-laminates such as those from the double-double family can be fully deployed to offer the drastic taper that is not possible with thick sub-laminates from the legacy family.

(8) The mismatch in stacking sequence between adjacent panels of legacy heterogeneous laminates is a critical issue and lead to designs with stress concentrations, prone to delamination, and a nightmare for manufacturing. Blending and ply drop become major issues for design and manufacturing. In use of double-double, one sub-laminate may be considered for the entire component eliminating the need for blending. The structure with one sub-laminates that is homogenized can be tapered to reach optimum weight and layup.

CONCLUSION

Of course, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sub-laminate module for use in forming a composite laminate structure, the sub-laminate module comprising:
   a first ply set containing a first ply layer oriented at a first angle and a second ply layer oriented at a second angle, the second angle being unequal the first angle;
   a second ply set containing a third ply layer oriented at a third angle and a fourth ply layer oriented at a fourth angle, the fourth angle being unequal the third angle;
   a first acute angle defined by a first difference between an absolute value of the first angle and the second angle; and
   a second acute angle defined by a second difference between an absolute value of the third angle and the fourth angle, the second acute angle being the same as the first acute angle,
   wherein the second ply layer is positioned adjacent the third ply layer and the second and third ply layers are both positioned intermediate the first and fourth ply layers, so as to define a staggered double-double helix sequence of the respective ply layers.

2. The sub-laminate module of claim 1, wherein the staggered double-double helix sequence is [$\Phi$/−$\Psi$/−$\Phi$/$\Psi$], such that the first ply layer is oriented at $\Phi$, the second ply layer is oriented at −Ψ, the third ply layer is oriented at −Φ, and the fourth ply layer is oriented at Ψ.

3. The sub-laminate module of claim 2, wherein:
Φ lies in a range from 0 to 60 degrees; and
Ψ lies in a range from 30 to 90 degrees.

4. The sub-laminate module of claim 3, wherein the first and second acute angles are less than or equal to 40 degrees.

5. The sub-laminate module of claim 1, wherein the staggered double-double helix sequence is [Φ/Ψ/−Φ/−Ψ], such that the first ply layer is oriented at Φ, the second ply layer is oriented at Ψ, the third ply layer is oriented at −Φ, and the fourth ply layer is oriented at −Ψ.

6. The sub-laminate module of claim 5, wherein:
Φ lies in a range from 20 to 70 degrees; and
Ψ lies in a range from 20 to 70 degrees.

7. The sub-laminate module of claim 5, wherein the first and second acute angles are less than or equal to 40 degrees.

8. The sub-laminate module of claim 1, wherein the staggered double-double helix sequence is [Φ/−Ψ/Ψ/−Φ], such that the first ply layer is oriented at Φ, the second ply layer is oriented at −Ψ, the third ply layer is oriented at Ψ, and the fourth ply layer is oriented at −Φ.

9. The sub-laminate module of claim 8, wherein:
Φ lies in a range from 10 to 40 degrees when Ψ lies in a range from 0 to 10 degrees;
Φ lies in a range from 50 to 70 degrees when Ψ lies in a range from 20 to 40 degrees; and
Φ lies in a range from 80 to 90 degrees when Ψ lies in a range from 50 to 80 degrees.

10. The sub-laminate module of claim 8, wherein the first and second acute angles are less than or equal to 40 degrees.

11. The sub-laminate module of claim 1, wherein the staggered double-double helix sequence is [Φ/Ψ/−Ψ/−Φ], such that the first ply layer is oriented at Φ, the second ply layer is oriented at Ψ, the third ply layer is oriented at −Ψ, and the fourth ply layer is oriented at −Φ.

12. The sub-laminate module of claim 11, wherein:
Φ lies in a range from 10 to 40 degrees when Ψ lies in a range from 0 to 10 degrees;
Φ lies in a range from 30 to 70 degrees when Ψ lies in a range from 20 to 40 degrees; and
Φ lies in a range from 80 to 90 degrees when Ψ lies in a range from 50 to 80 degrees.

13. The sub-laminate module of claim 11, wherein the first and second acute angles are greater than less than or equal to 40 degrees.

14. A composite laminate structure comprising:
at least two sub-laminate modules according to claim 1, wherein:
the fourth ply of a first of the at least two sub-laminate modules is positioned, during stacking thereof, adjacent the first ply of a second of the at least two-sub-laminate modules; and
orientation values of [Φ/Ψ] are independent in each of the at least two sub-laminate modules.

15. The composite laminate structure of claim 14, wherein:
the staggered double-double helix sequence of the first sub-laminate module is a first sequence of [Φ/−Ψ/−Φ/Ψ],
the staggered double-double helix sequence of the second sub-laminate module is a second sequence of [Φ/−Ψ/Ψ/−Φ], and
a 45-degree difference separates the first and second sequences.

16. A composite laminate structure comprising a plurality of sub-laminate modules each comprising:

a first ply set containing a first ply layer oriented at a first angle and a second ply layer oriented at a second angle, the second angle being unequal the first angle;
a second ply set containing a third ply layer oriented at a third angle and a fourth ply layer oriented at a fourth angle, the fourth angle being unequal the third angle;
a first acute angle defined by a first difference between an absolute value of the first angle and the second angle; and
a second acute angle defined by a second difference between an absolute value of the third angle and the fourth angle, the second acute angle being the same as the first acute angle,
wherein the second ply layer is positioned adjacent the third ply layer and the second and third ply layers are both positioned intermediate the first and fourth ply layers, so as to define a staggered double-double helix sequence of the respective ply layers.

17. The composite laminate structure of claim 16, wherein:
the plurality of sub-laminate modules comprises at least three distinct modules;
the staggered double-double helix sequence of two or more of the sub-laminate modules are different relative to one another; and
the staggered double-double helix sequence is selected from the group consisting of:
a first staggered sequence of [Φ/−Ψ/−Φ/Ψ];
a second staggered sequence of [Φ/Ψ/−Φ/−Ψ];
a third staggered sequence of [Φ/−Ψ/Ψ/−Φ]; and
a fourth staggered sequence of [Φ/Ψ/−Ψ/−Φ].

18. The composite laminate structure claim of 17, wherein:
the plurality of sub-laminate modules comprises at least four distinct modules stacked such that two modules are exterior facing and two modules are interior facing relative to a set of opposing outside surfaces of the composite laminate structure;
the staggered double-double helix sequence of the two interior facing modules are different relative to the staggered double-double helix sequence of the two exterior facing modules; and
the staggered double-double helix sequences are selected from the group consisting of:
a first staggered sequence of [Φ/−Ψ/−Φ/Ψ];
a second staggered sequence of [Φ/Ψ/−Φ/−Ψ];
a third staggered sequence of [Φ/−Ψ/Ψ/−Φ]; and
a fourth staggered sequence of [Φ/Ψ/−Ψ/−Ψ].

19. The composite laminate structure of claim 18, wherein:
the staggered double-double helix sequences of the first and fourth sub-laminate modules define a first sequence of [Φ/−Ψ/−Φ/Ψ],
the staggered double-double helix sequences of the second and third sub-laminate modules define a second sequence of [Φ/−Ψ/Ψ/−Φ], the second and third sub-laminate modules being interior and adjacent modules intermediate the exterior first and fourth sub-laminate modules, and
a 45-degree difference separates the first and second sequences.

20. A method of manufacturing a sub-laminate module for use in forming a composite laminate structure, the method comprising the steps of:
positioning a first ply set in a first orientation, the first ply set containing a first ply layer oriented at a first angle and a second ply layer oriented at a second angle, the second angle being unequal the first angle, a difference between an absolute value of the first and second angles defining a first acute angle there-between;

positioning a second ply set in a second orientation different from the first orientation, the second ply set containing a third ply layer oriented at a third angle and a fourth ply layer oriented at a fourth angle, the fourth angle being unequal the third angle, a difference between the third and fourth angles defining a second acute angle there-between, the second acute angle being the same as the first acute angle; and stacking the second ply set adjacent the first ply set so as to define a staggered double-double helix sequence of the respective layers, wherein, when stacked, the second ply layer is positioned adjacent the third ply layer and the second and third ply layers are both positioned intermediate the first and fourth ply layers.

* * * * *